(12) United States Patent
Khoshnevisan et al.

(10) Patent No.: US 12,143,257 B2
(45) Date of Patent: Nov. 12, 2024

(54) REFERENCE SIGNAL BUNDLING FOR UPLINK CHANNEL REPETITION

(71) Applicant: QUALCOMM Incorporated, San Diego, CA (US)

(72) Inventors: Mostafa Khoshnevisan, San Diego, CA (US); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 18/053,208

(22) Filed: Nov. 7, 2022

(65) Prior Publication Data

US 2023/0117511 A1   Apr. 20, 2023

Related U.S. Application Data

(63) Continuation of application No. 17/151,102, filed on Jan. 15, 2021, now Pat. No. 11,516,066.

(51) Int. Cl.
*H04L 27/26* (2006.01)
*H04L 1/18* (2023.01)
(Continued)

(52) U.S. Cl.
CPC ............ *H04L 27/2695* (2013.01); *H04L 1/18* (2013.01); *H04L 5/0048* (2013.01);
(Continued)

(58) Field of Classification Search
CPC ..... H04L 27/2695; H04L 1/18; H04L 5/0048; H04L 27/0014; H04L 27/2675;
(Continued)

(56) References Cited

U.S. PATENT DOCUMENTS

| 2016/0197712 A1 | 7/2016 | Sorrentino et al. |
| 2016/0286555 A1* | 9/2016 | Papasakellariou .... H04W 48/12 |

(Continued)

FOREIGN PATENT DOCUMENTS

| CN | 105765931 A | 7/2016 |
| KR | 20170128206 A | 11/2017 |

(Continued)

OTHER PUBLICATIONS

International Search Report and Written Opinion—PCT/US2021/073000—ISA/EPO—Apr. 7, 2022.
(Continued)

*Primary Examiner* — Tejis Daya
(74) *Attorney, Agent, or Firm* — Holland & Hart LLPQualcomm Incorporated

(57) ABSTRACT

Methods, systems, and devices for wireless communications are described. A user equipment (UE), that is configured for demodulation reference signal (DMRS) bundling, may receive a control message that schedules first and second sets of repetitions of an uplink transmission. The UE may determine a phase coherency configuration to be applied for DMRS transmissions corresponding to each set of repetitions. The phase coherency configuration may be determined based on a phase coherency capability of the UE, and the phase coherency configuration may specify that phase coherency is to be maintained for one or more of the first set of repetitions separate from one or more of the second set of repetitions. The UE may transmit the first set of repetitions with a first set of demodulation reference signals and the second set of repetitions with a second set of demodulation reference signals in accordance with the phase coherency configuration.

17 Claims, 17 Drawing Sheets

(51) Int. Cl.
*H04L 5/00* (2006.01)
*H04L 27/00* (2006.01)

(52) U.S. Cl.
CPC ...... *H04L 27/0014* (2013.01); *H04L 27/2675* (2013.01); *H04L 2027/0083* (2013.01)

(58) Field of Classification Search
CPC ........... H04L 2027/0083; H04L 1/1812; H04L 1/1858; H04L 1/08; H04L 5/0051; H04L 5/0053; H04L 5/0094; H04L 25/0224; H04L 27/26132
See application file for complete search history.

(56) References Cited

U.S. PATENT DOCUMENTS

| | | | |
|---|---|---|---|
| 2017/0332365 A1* | 11/2017 | Lin | H04W 72/20 |
| 2017/0347268 A1* | 11/2017 | Chen | H04L 5/0044 |
| 2018/0109971 A1* | 4/2018 | Takeda | H04L 5/0053 |
| 2019/0230656 A1 | 7/2019 | Soriaga et al. | |
| 2020/0052827 A1* | 2/2020 | Vilaipornsawai | H04L 5/0044 |
| 2020/0067676 A1 | 2/2020 | Yi | |
| 2020/0351047 A1 | 11/2020 | Akkarakaran et al. | |
| 2022/0150003 A1* | 5/2022 | Takeda | H04L 1/1896 |
| 2022/0231886 A1 | 7/2022 | Ly et al. | |
| 2022/0231899 A1 | 7/2022 | Khoshnevisan et al. | |
| 2022/0248430 A1* | 8/2022 | Ly | H04L 1/1864 |
| 2022/0311472 A1* | 9/2022 | Ly | H04B 1/7143 |
| 2022/0312413 A1* | 9/2022 | Cozzo | H04L 1/0003 |
| 2023/0283418 A1* | 9/2023 | Abdelghaffar | H04L 5/0094 370/329 |

FOREIGN PATENT DOCUMENTS

| | | |
|---|---|---|
| KR | 20180127249 A | 11/2018 |
| KR | 20200075897 A | 6/2020 |
| KR | 20200135501 A | 12/2020 |
| WO | WO-2015023220 A1 | 2/2015 |
| WO | WO-2019100264 A1 | 5/2019 |
| WO | WO-2021007239 A1 | 1/2021 |

OTHER PUBLICATIONS

Oppo: "PUCCH Enhancements for Coverage", 3GPP TSG RAN WG1 #104-e, R1-2100175, 3GPP, Mobile Competence Centre, 650, Route Des Lucioles, F-06921 Sophia-Antipolis Cedex, France, vol. RAN WG1, No. e-Meeting, 20210125-20210205, Feb. 5, 2021, 4 Pages, URL: https://www.3gpp.org/ftp/TSG_RAN/WG1_RL1/TSGR1_104-e/Docs/R1-2100175.zip.

VIVO: "Discussion on PUCCH Enhancements", 3GPP TSG RAN WG1 #104-e, R1-2100460, 3rd Generation Partnership Project, Mobile Competence Centre, 650, Route Des Lucioles, F-06921 Sophia-Antipolis Cedex, France, vol. RAN WG1, No. e-Meeting, 20210125-20210205, Jan. 18, 2021, XP051970382, 6 Pages.

Moderator (Qualcomm): "FL Summary #2 of PUCCH Coverage Enhancement", 3GPP TSG RAN WG1 #103-e, R1-2009405, 3rd Generation Partnership Project, Mobile Competence Centre, 650, Route Des Lucioles, F-06921 Sophia-Antipolis Cedex, France, vol. RAN W61, No. e-Meeting, 20201026-20201113, Oct. 30, 2020, 37 Pages, XP051948670, Sections 2.4 and 2.5.

Moderator (Qualcomm): "FL Summary #2 of PUCCH Coverage Enhancement", 3GPP TSG RAN WG1 #103-e, R1-2009405, e-Meeting, Oct. 26, 2020-Nov. 13, 2020, Nov. 2, 2020, pp. 1-37.

* cited by examiner

REFERENCE SIGNAL BUNDLING FOR UPLINK CHANNEL REPETITION

CROSS REFERENCE

The present application for patent is a Continuation of U.S. patent application Ser. No. 17/151,102 by KHOSHNEVISAN et al., entitled "REFERENCE SIGNAL BUNDLING FOR UPLINK CHANNEL REPETITION" filed Jan. 15, 2021, assigned to the assignee hereof, and expressly incorporated by reference in its entirety herein.

FIELD OF TECHNOLOGY

The following relates to wireless communications, including reference signal bundling for uplink channel repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may support repetitions of various channels in order to improve communication reliability, among other benefits. For example, a user equipment (UE) may be configured to repeat an uplink data or control channel transmission in order to increase the likelihood of successful receipt at a base station.

SUMMARY

The described techniques relate to improved methods, systems, devices, and apparatuses that support reference signal bundling for uplink channel repetition. Generally, the described techniques provide for a user equipment (UE), configured for demodulation reference signal (DMRS) bundling, receiving a control message that schedules first and second sets of repetitions of an uplink transmission. The UE may determine a phase coherency configuration to be applied for DMRS transmissions corresponding to each set of repetitions. The phase coherency configuration may be determined based at least in part on a phase coherency capability of the UE, and the phase coherency configuration may specify that phase coherency is to be maintained for one or more of the first set of repetitions separate from one or more of the second set of repetitions. The UE may transmit the first set of repetitions with a first set of demodulation reference signals and the second set of repetitions with a second set of demodulation reference signals in accordance with the phase coherency configuration. The first set of repetitions and the second set of repetitions may vary from each other in various transmission parameters, frequency hops, or both.

A method for wireless communications at a user equipment (UE) is described. The method may include receiving one or more control messages scheduling a first set of repetitions of an uplink transmission and a second set of repetitions of the uplink transmission, determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions, and transmitting the first set of repetitions with the first set of demodulation reference signals and the second set of repetitions with the second set of demodulation reference signals in accordance with the phase coherency configuration.

An apparatus for wireless communications at a UE is described. The apparatus may include a processor, memory in electronic communication with the processor, and instructions stored in the memory. The instructions may be executable by the processor to cause the apparatus to receive one or more control messages scheduling a first set of repetitions of an uplink transmission and a second set of repetitions of the uplink transmission, determine a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions, and transmit the first set of repetitions with the first set of demodulation reference signals and the second set of repetitions with the second set of demodulation reference signals in accordance with the phase coherency configuration.

Another apparatus for wireless communications at a UE is described. The apparatus may include means for receiving one or more control messages scheduling a first set of repetitions of an uplink transmission and a second set of repetitions of the uplink transmission, means for determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions, and means for transmitting the first set of repetitions with the first set of demodulation reference signals and the second set of repetitions with the second set of demodulation reference signals in accordance with the phase coherency configuration.

A non-transitory computer-readable medium storing code for wireless communications at a UE is described. The code may include instructions executable by a processor to receive one or more control messages scheduling a first set of repetitions of an uplink transmission and a second set of repetitions of the uplink transmission, determine a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions, and transmit the first set of repetitions with the first set of demodulation reference signals and the second set of repetitions with the second set of demodulation reference signals in accordance with the phase coherency configuration.

Some examples of the method, apparatuses, and non-transitory computer-readable medium described herein may further include operations, features, means, or instructions for maintaining a first phase coherency for each demodulation reference signal transmission corresponding to the first set of repetitions in accordance with the phase coherency configuration and maintaining a second phase coherency for each demodulation reference signal transmission corresponding to the second set of repetitions in accordance with the phase coherency configuration.

Some examples of the method, apparatuses, and non-transitory computer-readable medium described herein may further include operations, features, means, or instructions for receiving a control message that may be indicative of a mapping scheme that the UE may be to use for transmitting the one or more of the first set of repetitions and the one or more of the second set of repetitions, where the phase coherency configuration may be determined based on the mapping scheme.

In some examples of the method, apparatuses, and non-transitory computer-readable medium described herein, the mapping scheme may be one of a cyclic mapping scheme, a sequential mapping scheme, or a half-half mapping scheme.

Some examples of the method, apparatuses, and non-transitory computer-readable medium described herein may further include operations, features, means, or instructions for determining that the UE may be to transmit the first set of repetitions and the second set of repetitions according to a cyclic mapping scheme such that the one or more of the first set of repetitions and the one or more of the second set of repetitions may be to be transmitted in an alternating order, transmitting each demodulation reference signal transmission for the first set of repetitions without maintaining a phase coherency in accordance with the phase coherency configuration, and transmitting each demodulation reference signal transmission for the second set of repetitions without maintaining the phase coherency in accordance with the phase coherency configuration.

Some examples of the method, apparatuses, and non-transitory computer-readable medium described herein may further include operations, features, means, or instructions for maintaining a first phase coherency for demodulation reference signal transmissions corresponding to contiguous first repetitions of the first set of repetitions in accordance with the phase coherency configuration and maintaining a second phase coherency for demodulation reference signal transmissions corresponding to contiguous second repetitions of the second set of repetitions in accordance with the phase coherency configuration.

Some examples of the method, apparatuses, and non-transitory computer-readable medium described herein may further include operations, features, means, or instructions for maintaining the first phase coherency across demodulation reference signal transmissions corresponding to each contiguous set of first repetitions of the first set of repetitions in accordance with the phase coherency configuration and maintaining the second phase coherency across demodulation reference signal transmissions corresponding to each contiguous set of second repetitions of the second set of repetitions in accordance with the phase coherency configuration.

In some examples of the method, apparatuses, and non-transitory computer-readable medium described herein, receiving the one or more control messages may include operations, features, means, or instructions for receiving a control message that specifies that the UE may be to use a sequential mapping scheme such that two first repetitions of the first set of repetitions may be to be transmitted contiguously and two second repetitions of the second set of repetitions may be to be transmitted contiguously.

In some examples of the method, apparatuses, and non-transitory computer-readable medium described herein, receiving the one or more control messages may include operations, features, means, or instructions for receiving a control message that specifies that the UE may be to use a half-half mapping such that the first set of repetitions may be to be transmitted contiguously, and the second set of repetitions may be to be transmitted contiguously.

In some examples of the method, apparatuses, and non-transitory computer-readable medium described herein, receiving the one or more control messages may include operations, features, means, or instructions for receiving a control message that indicates that the UE may be to use a first set of transmission parameters for transmitting the first set of repetitions and may be to use a second set of transmission parameters for transmitting the second set of repetitions, where the first set of repetitions and the corresponding first set of demodulation reference signals may be transmitted according to the first set of transmission parameters and the second set of repetitions and the corresponding second set of demodulation reference signals may be transmitted according to the second set of transmission parameters.

In some examples of the method, apparatuses, and non-transitory computer-readable medium described herein, the first set of transmission parameters and the second set of transmission parameters include one or more an uplink beam, at least one uplink power control parameter, and a precoding, and at least one value for the second set of transmission parameters may be different from a corresponding value for the first set of transmission parameters.

Some examples of the method, apparatuses, and non-transitory computer-readable medium described herein may further include operations, features, means, or instructions for receiving a control message that indicates that the UE may be to use frequency hopping such that the UE may be to transmit the first set of repetitions at a first frequency and the second set of repetitions at a second frequency, where the phase coherency configuration may be determined based on the indication that the UE may be to use the frequency hopping.

Some examples of the method, apparatuses, and non-transitory computer-readable medium described herein may further include operations, features, means, or instructions for determining that the UE may be to transmit the first set of repetitions at a first frequency and the second set of repetitions at a second frequency, maintaining a first phase coherency for each demodulation reference signal transmission corresponding to the first set of repetitions at the first frequency in accordance with the phase coherency configuration, and maintaining a second phase coherency for each demodulation reference signal transmission corresponding to the second set of repetitions at the second frequency in accordance with the phase coherency configuration.

Some examples of the method, apparatuses, and non-transitory computer-readable medium described herein may further include operations, features, means, or instructions for determining that the UE may be to transmit the first set of repetitions at a first frequency and the second set of repetitions at a second frequency, transmitting each demodulation reference signal transmission corresponding to the first set of repetitions at the first frequency without maintaining a phase coherency in accordance with the phase coherency configuration, and transmitting each demodulation reference signal transmission corresponding to the second set of repetitions at the second frequency without maintaining the phase coherency in accordance with the phase coherency configuration.

Some examples of the method, apparatuses, and non-transitory computer-readable medium described herein may further include operations, features, means, or instructions for determining that the UE may be to transmit the first set of repetitions at a first frequency and the second set of repetitions at a second frequency, maintaining a first phase coherency for demodulation reference signal transmissions corresponding to contiguous first repetitions of the first set of repetitions at the first frequency in accordance with the phase coherency configuration, and maintaining a second phase coherency for demodulation reference signal transmissions corresponding to contiguous second repetitions of the second set of repetitions at the second frequency in accordance with the phase coherency configuration.

Some examples of the method, apparatuses, and non-transitory computer-readable medium described herein may further include operations, features, means, or instructions for maintaining the first phase coherency across demodulation reference signal transmissions and corresponding to each contiguous set of first repetitions of the first set of repetitions at the first frequency in accordance with the phase coherency configuration and maintaining the second phase coherency across demodulation reference signal transmissions and corresponding to each contiguous set of second repetitions of the second set of repetitions at the second frequency in accordance with the phase coherency configuration.

In some examples of the method, apparatuses, and non-transitory computer-readable medium described herein, receiving the one or more control messages may include operations, features, means, or instructions for receiving a scheduling indication that schedules the first set of repetitions and the second set of repetitions of a physical uplink shared channel transmission, and the repetitions may be to be transmitted using a type A configuration or a type B configuration, where the type A configuration indicates that consecutive repetitions may be to be transmitted in consecutive slots and the type B configuration indicates that consecutive repetitions may be consecutively transmitted across one or more slots.

In some examples of the method, apparatuses, and non-transitory computer-readable medium described herein, receiving the one or more control messages may include operations, features, means, or instructions for receiving a scheduling indication that schedules the first set of repetitions and the second set of repetitions of a physical uplink control channel transmission, and the repetitions may be to be transmitted using an inter-slot configuration or an intra-slot configuration, where the inter-slot configuration indicates that consecutive repetitions may be to be transmitted in consecutive slots and the intra-slot configuration indicates that consecutive repetitions may be consecutively transmitted across one or more slots.

Some examples of the method, apparatuses, and non-transitory computer-readable medium described herein may further include operations, features, means, or instructions for transmitting, by the UE, an indication of a UE capability to support maintaining a phase coherency across non-consecutive repetitions, where the one or more control messages may be received based on the indication of the UE capability.

Some examples of the method, apparatuses, and non-transitory computer-readable medium described herein may further include operations, features, means, or instructions for receiving a demodulation reference signal bundling configuration that may be indicative that the UE may be to maintain phase coherency for uplink communications, where the phase coherency configuration may be determined based on receiving the demodulation reference signal bundling configuration.

A method for wireless communications at a base station is described. The method may include transmitting, to a UE, one or more control messages scheduling a first set of repetitions of an uplink transmission and a second set of repetitions of the uplink transmission in accordance with a repetition configuration, determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions, and receiving one or both of the first set of repetitions with the first set of demodulation reference signals and the second set of repetitions with the second set of demodulation reference signals in accordance with the phase coherency configuration.

An apparatus for wireless communications at a base station is described. The apparatus may include a processor, memory in electronic communication with the processor, and instructions stored in the memory. The instructions may be executable by the processor to cause the apparatus to transmit, to a UE, one or more control messages scheduling a first set of repetitions of an uplink transmission and a second set of repetitions of the uplink transmission in accordance with a repetition configuration, determine a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions, and receive one or both of the first set of repetitions with the first set of demodulation reference signals and the second set of repetitions with the second set of demodulation reference signals in accordance with the phase coherency configuration.

Another apparatus for wireless communications at a base station is described. The apparatus may include means for transmitting, to a UE, one or more control messages scheduling a first set of repetitions of an uplink transmission and a second set of repetitions of the uplink transmission in accordance with a repetition configuration, means for determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions, and means for receiving one or both of the first set of repetitions with the first set of demodulation reference signals and the second set of repetitions with the second set of demodulation reference signals in accordance with the phase coherency configuration.

A non-transitory computer-readable medium storing code for wireless communications at a base station is described. The code may include instructions executable by a processor to transmit, to a UE, one or more control messages scheduling a first set of repetitions of an uplink transmission and a second set of repetitions of the uplink transmission in accordance with a repetition configuration, determine a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions, and receive one or both of the first set of repetitions with the first set of demodulation reference signals and the second set of repetitions with the second set of demodulation reference signals in accordance with the phase coherency configuration.

Some examples of the method, apparatuses, and non-transitory computer-readable medium described herein may further include operations, features, means, or instructions for estimating a channel for the uplink transmission by combining at least two received demodulation reference signals corresponding to the first set of repetitions or corresponding to the second set of repetitions in accordance with the phase coherency configuration.

Some examples of the method, apparatuses, and non-transitory computer-readable medium described herein may further include operations, features, means, or instructions for combining the at least two received demodulation reference signals corresponding to non-consecutive first transmissions of the first set of repetitions or non-consecutive second transmissions of the second set of repetitions.

Some examples of the method, apparatuses, and non-transitory computer-readable medium described herein may further include operations, features, means, or instructions for combining the at least two received demodulation reference signals corresponding to consecutive first transmissions of the first set of repetitions or consecutive second transmissions of the second set of repetitions.

Some examples of the method, apparatuses, and non-transitory computer-readable medium described herein may further include operations, features, means, or instructions for transmitting a control message that may be indicative of a mapping scheme that the UE may be to use for transmitting the one or more of the first set of repetitions and the one or more of the second set of repetitions, where the phase coherency configuration may be determined based on the mapping scheme.

In some examples of the method, apparatuses, and non-transitory computer-readable medium described herein, the mapping scheme may be one of a cyclic mapping scheme, a sequential mapping scheme, or a half-half mapping scheme.

Some examples of the method, apparatuses, and non-transitory computer-readable medium described herein may further include operations, features, means, or instructions for transmitting, to the UE, an indication that the UE may be to use a first frequency for transmitting the first set of repetitions and a second frequency for transmitting the second set of repetitions, where the phase coherency configuration may be determined based on transmitting the indication.

Some examples of the method, apparatuses, and non-transitory computer-readable medium described herein may further include operations, features, means, or instructions for transmitting, to the UE, a scheduling indication that schedules the first set of repetitions and the second set of repetitions of a physical uplink shared channel transmission, and the repetitions may be to be transmitted using a type A configuration or a type B configuration, where the type A configuration indicates that consecutive repetitions may be to be transmitted in consecutive slots and the type B configuration indicates that consecutive repetitions may be consecutively transmitted across one or more slots.

Some examples of the method, apparatuses, and non-transitory computer-readable medium described herein may further include operations, features, means, or instructions for transmitting, to the UE, a scheduling indication that schedules the first set of repetitions and the second set of repetitions of a physical uplink control channel transmission, and the repetitions may be to be transmitted using an inter-slot configuration or an intra-slot configuration, where the inter-slot configuration indicates that consecutive repetitions may be to be transmitted in consecutive slots and the intra-slot configuration indicates that consecutive repetitions may be consecutively transmitted across one or more slots.

Some examples of the method, apparatuses, and non-transitory computer-readable medium described herein may further include operations, features, means, or instructions for receiving, from the UE, an indication of a UE capability to support maintaining a phase coherency across non-consecutive repetitions, where the phase coherency configuration may be determined based on the UE capability.

Some examples of the method, apparatuses, and non-transitory computer-readable medium described herein may further include operations, features, means, or instructions for transmitting, to a UE, a demodulation reference signal bundling configuration that may be indicative that the UE may be to maintain phase coherency for uplink communications, where the phase coherency configuration may be determined based on transmitting the demodulation reference signal bundling configuration.

DETAILED DESCRIPTION

Figure 1:
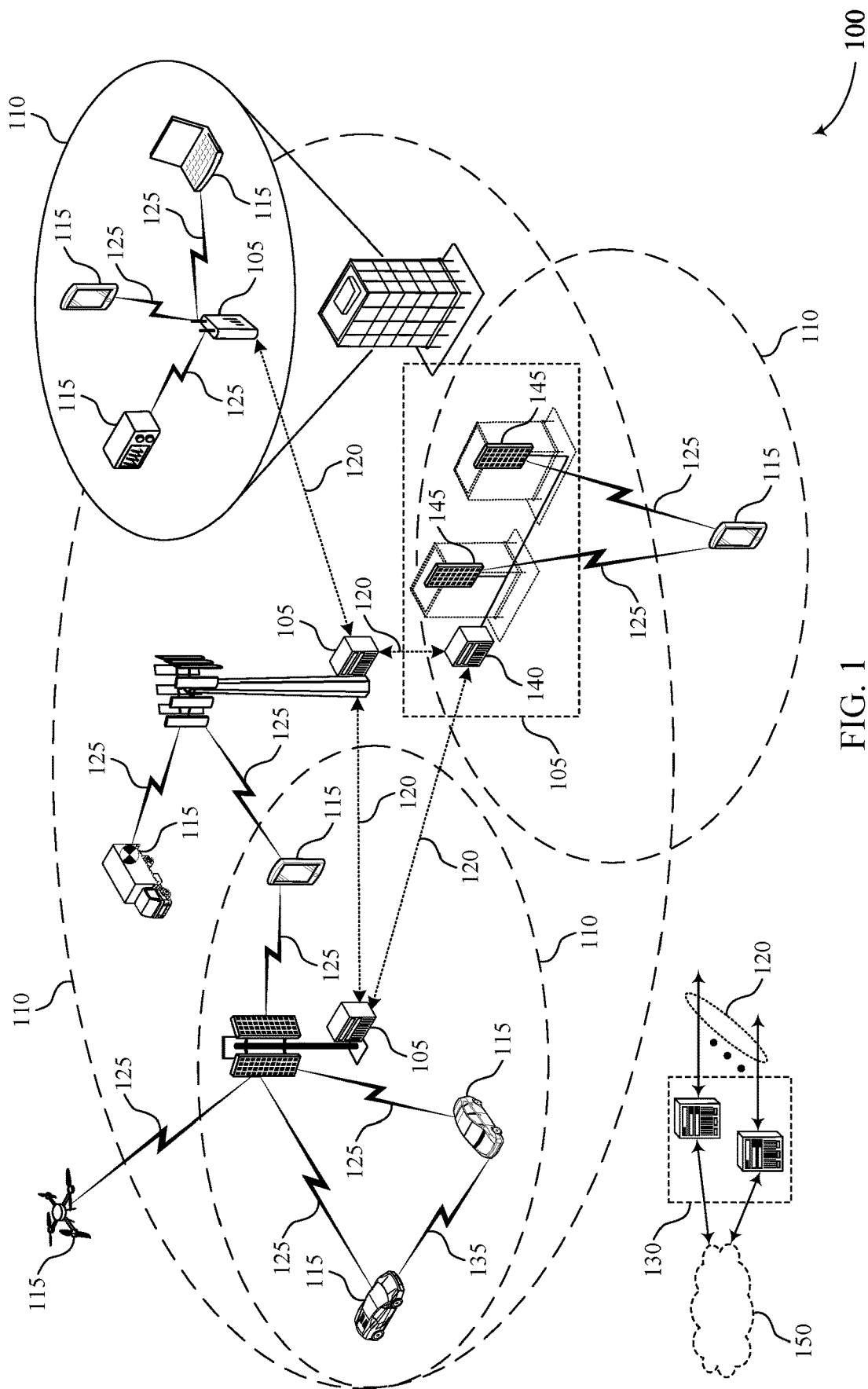
FIG. 1 illustrates an example of a wireless communications system that supports reference signal bundling for uplink channel repetition in accordance with aspects of the present disclosure.

A wireless communications system may support bundling of reference signals, such as demodulation reference signals (DMRSs), in order to support improved channel estimation and communication performance. When two or more reference signals are bundled, the reference signals may be transmitted such that a phase coherency is maintained for each reference signal transmission. Maintaining a phase coherency may support a receiving device combining the signals. In the case of DMRS bundling, the receiving device (e.g., a base station) may be able to estimate a channel jointly or coherently based on the combined signals.

Wireless communications systems may also support channel repetitions of various channels in order to improve communication reliability, among other benefits. For example, a user equipment (UE) may be configured to repeat an uplink data or control channel transmission in order to increase the likelihood of successful receipt at a base station. Various repetition configurations may be supported for various channels. In some cases, channel repetitions may be configured into two different sets, where each set is to be transmitted according to a respective set of transmission parameters. In some cases, a transmission parameter corresponds to a transmit beam, and as such, each set of repetitions may be transmitted using a different transmit beam. Using different transmit beams may support increased likelihood of reception and decoding of a channel at a receiving device, such as a base station, with multiple transmission-reception points (TRPs). In other cases, each set of repetitions may be associated with different frequency hops from a frequency hopping pattern.

Techniques described herein support DMRS bundling configurations for uplink channel repetitions. If a UE is scheduled or configured to perform two sets of uplink channel repetitions, such as physical uplink shared channel (PUSCH) or physical uplink control channel (PUCCH) repetitions, then the UE may determine a phase coherency configuration to be applied to the DMRSs corresponding to the uplink channel repetitions. The UE may determine to maintain a phase coherency for each set of repetitions, such that DMRS transmissions corresponding to each respective set may be combined at the base station for channel estimation. If the UE is unable to maintain a phase coherency for non-contiguous repetitions (e.g., the UE is not capable), then the UE may determine to maintain the phase coherency for contiguous sets of repetitions for each set, if the pattern or mapping supports contiguous repetitions in a set.

These techniques may be applicable to various repetition configurations for PUSCH or PUCCH repetitions. In the case of PUSCH repetitions, these techniques may be applicable to Type A repetitions (repetitions in different slots) or Type B repetitions (consecutive repetitions in one or more slots). In the case of PUCCH repetitions, these techniques may be applicable to inter-slot repetitions or intra-slot repetitions. A UE that is configured with frequency hopping for channel repetitions may perform similar techniques for DMRS bundling as described herein for varying transmission parameters.

Aspects of the disclosure are initially described in the context of wireless communications systems. Aspects of the disclosure are further described with respect to a wireless communications system illustrating channel repetitions, diagrams of repetition patterns, and a process flow diagram. Aspects of the disclosure are further illustrated by and described with reference to apparatus diagrams, system diagrams, and flowcharts that relate to reference signal bundling for uplink channel repetition.

FIG. 1 illustrates an example of a wireless communications system 100 that supports reference signal bundling for uplink channel repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARM) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support bundling of reference signals by a UE 115 and/or a base station 105 in order to support improved channel estimation and communication performance. When two or more reference signals are bundled, the reference signals may be transmitted by the base station 105 or the UE 15 such that the phase coherency is maintained for each reference signal transmission. A receiving device (e.g., base station 105 or UE 115) that receives bundled reference signals may be able to combine the signals due to the phase coherency, which may support joint/coherent channel estimation. The wireless communications system 100 may also support channel transmission repetition in order to improve communication reliability. For example, a UE 115 may be configured to repeat a PUSCH or PUCCH transmission such that the base station 105 is more likely to receive/decode the transmission. In some cases, channel repetitions may be configured into to two or more sets, where each set is to be transmitted according to a respective set of transmission parameters. For example, each set may be transmitted using a different beam to increase likelihood of successful reception and decoding at a base station 105 configured with multiple antenna panels or TRPs.

According to techniques described herein, DMRS bundling may be configured for channel repetitions with one or more sets. For example, if a UE 115 is scheduled for two sets of uplink channel repetitions (e.g., PUSCH or PUCCH repetitions), the UE 115 may also be configured to bundle DMRS transmissions. In such cases, the UE 115 may determine to maintain a phase coherency for each DMRS transmission for a respective set. As such, the base station 105 that receives bundled DMRSs corresponding to one or both of the sets may jointly estimate the channel. However, in some examples, a UE 115 may not be capable of maintaining a phase coherency over non-consecutive or non-contiguous transmissions. In such cases, the UE 115 may determine to maintain a phase coherency for contiguous or consecutive repetitions in a set, provided that the repetition pattern supports contiguous or consecutive repetitions. If the repetition mapping is sequential, meaning the UE 115 is to alternate between repetitions of each set, and the UE 115 is unable to maintain phase coherency for non-contiguous repetitions, then the UE 115 may transmit each DMRS without maintaining the phase coherency.

As described in additional detail herein, the DMRS bundling techniques may be applicable to various types of PUSCH or PUCCH repetitions by a UE 115. In the case of PUSCH repetitions, these techniques may be applicable to Type A repetitions (repetitions in different slots) or Type B repetitions (consecutive repetitions in one or more slots). In the case of PUCCH repetitions, these techniques may be similarly applicable to inter-slot repetitions or intra-slot repetitions. In some cases, a base station 105 may configure a UE 115 to perform frequency hopping for channel repetitions, and the UE 115 may perform similar techniques for DMRS bundling.

Figure 2:
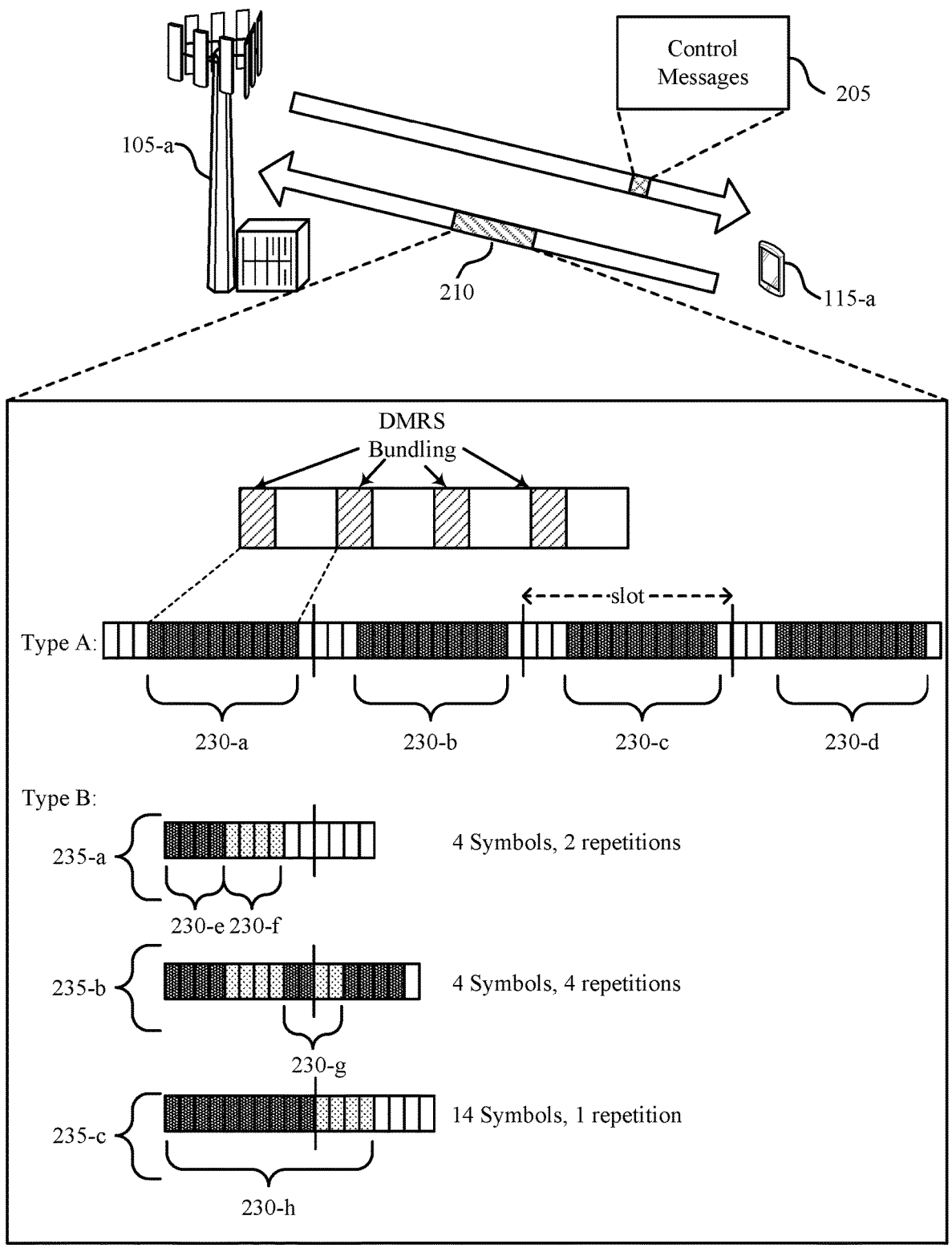
FIG. 2 illustrates an example of a wireless communications system that supports reference signal bundling for uplink channel repetition in accordance with aspects of the present disclosure.

FIG. 2 illustrates an example of a wireless communications system 200 that supports reference signal bundling for uplink channel repetition in accordance with aspects of the present disclosure. The wireless communications system 200 may implement aspects of wireless communications system 100 and includes a base station 105-*a* and a UE 115-*a*, which may be examples of the corresponding devices described with respect to FIG. 1. The wireless communications system 200 may support DMRS bundling and uplink channel repetitions, as described herein. FIG. 2 illustrates bundled DMRSs 225 corresponding to PUSCH 220 repetitions, but it should be understood that similar techniques may be applicable to PUCCH repetitions, as described herein.

Wireless communications system 200 may support PUSCH or PUCCH DMRS bundling. When PUSCH or PUCCH DMRSs 225 are bundled, the UE 115-*a* may maintain a phase coherency for each DMRS transmission. The base station 105-*a* may receive the bundled DMRSs and use one or more of the bundled DMRSs to estimate a channel jointly/coherently, which may improve channel estimation performance. That is, the base station 105-*a* may combine bundled DMRSs 225 for channel estimation.

PUSCH phase discontinuity may occur based on different resource allocations for different PUSCH symbols, different transmit powers, different uplink beams (e.g., in FR2), and non-contiguous resource allocations. For example, if a timing gap between PUSCH symbols is larger than a threshold gap, then other uplink channels or signals (e.g., PUCCH, sounding reference signal (SRS)) or downlink channels or signals (e.g., physical downlink control channel (PDCCH), physical downlink shared channel (PDSCH), synchronization signal block (SSB), channel state information reference signal (CSI-RS)) might be transmitted during the gap, which may cause phase discontinuity.

PUSCH 220 repetition may have two different configurations (e.g., indicated via a control message 205): Type A and Type B. For a Type A repetition 220, in each slot, the same symbols (e.g., same starting symbol and same length) may be used for the PUSCH repetition 220. A number of repetitions, K, may be either semi-statically configured (e.g., RRC messaging) or dynamically indicated in a time domain resource assignment (TDRA) field in downlink control information. For the RRC configuration, if the UE 115-*a* is configured with a PUSCH-AggregationFactor parameter, the number of repetitions K may be equal to the PUSCH-AggregationFactor value. For the dynamic indication, if the numberofrepetitions parameter is present in the TDRA table, then the number of repetitions K may be equal to numberofrepetitions indicated by the DCI (pointing to a TDRA row). As illustrated in FIG. 1, the Type A repetition includes repetitions 230-*a*, 230-*b*, 230-*c*, and 230-*d* (e.g., K=4 repetitions). Each repetition 230 may include the PUSCH 220 with a respective DMRS 225.

A Type B repetition may include a number of "nominal" repetitions across one or more consecutive slots. The number of nominal repetitions may be indicated in the downlink control information. For example, numberofrepetitions may be configured per row of the TDRA table and may be dynamically indicated by the downlink control information by pointing to a TDRA row. Each nominal repetition may have the same length. For example, in repetition configuration 235-*a*, each of the two repetitions (e.g., K=2) is four symbols. In some cases, a nominal repetition is divided into multiple actual repetitions due to: (1) the repetition crossing a slot boundary, or (2) one or more symbols of a nominal repetition being identified as invalid, where a nominal repetition is divided into multiple actual repetitions after removing invalid symbols. Each actual repetition may have an associated DMRS 225, and the DMRS location may be based on the actual repetitions. For repetition configuration 235-*b*, there are four repetitions with four symbols per repetition configured. Nominal repetition 230-*g* falls on the slot boundary, and as such, is divided into two different actual repetitions. Each of the actual repetitions on either side of the slot boundary may have a respective DMRS 225. For repetition configuration 235-*c*, there is one nominal repetition 230-*h* with fourteen symbols. The nominal repetition 230-*h* crosses the slot boundary, and as such, is divided into two actual repetitions, each with a respective DMRS 225.

If different PUSCH repetitions are intended to be received at different TRPs, panels, or antennas at the base station 105-*a*, using the same beam (or the same transmission parameters) may be inefficient. In some scenarios, to improve the reliability and robustness for PUSCH transmissions, the PUSCH repetitions are configured into two sets, where each set is to be transmitted in accordance with a respective set of transmission parameters. In multi-TRP scenarios or other scenarios, the different sets may improve diversity. For example, if one link is blocked, then another repetition via another link may be decoded by different TRP or antenna panel. Thus, a set of transmission parameters may include an uplink beam (e.g., spatial relation information), power control parameters, precoder parameters (TPMI), etc. Thus, two sets of repetitions may correspond to two different SRS resource sets. The downlink control information may indicate two beams, two sets of power control parameters, etc. by indicating one or more SRS resources within each of the two SRS resource sets.

For applying the sets of parameters, one or more mapping patterns may be configured via a control message 205 (e.g., RRC messaging). For example, the control message 205 may indicate that the UE 115-*a* is to use a cyclic mapping pattern for the two sets of repetitions. For the cyclic mapping pattern, the first and second set of transmission parameters (e.g., the first and second beam) are to be applied to the first and second PUSCH repetition, respectively, and this pattern may be repeated for the remaining PUSCH repetitions. In another example, the control message 205 may indicate that the UE 115-*a* is to use a sequential mapping pattern, which means that the first set of parameters (e.g., first beam) is to be applied to the first and second PUSCH repetitions, and the second set of transmission parameters (e.g., second beam) is to be applied to the third and fourth PUSCH repetitions. This pattern may continue for the remaining PUSCH repetitions. Another type of mapping pattern may be a half-half mapping pattern, where the first set of parameters (e.g., first beam) is to be applied for the first half of PUSCH repetitions, and the second set of transmission parameters (e.g., the second beam) is to be applied for the second half of the PUSCH repetitions. These repetition patterns are further illustrated and described with respect to FIG. 3.

These patterns and configurations may be similarly applicable to PUCCH repetitions. Up to two spatial relation information configurations may be activated per PUCCH resource via MAC-CE (e.g., control message 205). PUCCH repetitions may be configured into two sets, such that each set is transmitted using a respective uplink beam (e.g., spatial relation information) and power control parameters. The mapping patterns described herein with respect to the PUSCH repetitions may be applicable to PUCCH repetitions. Further, the repetitions for PUCCH may have one of two configurations: inter-slot repetition and intra-slot repetition. For inter-slot repetition, one PUCCH resource carries uplink control information, and the same PUCCH resource in one or more additional slots may carry the repetition of the uplink control information. For intra-slot repetition, one PUCCH resource may carry the uplink control information, and the same PUCCH resource in one or more additional sub-slots within a slot carry a repetition of the uplink control information.

According to techniques described herein, if UE 115-a is configured with PUSCH or PUCCH DMRS 225 bundling and receives a control message that schedules PUSCH/PUCCH repetitions with two sets of repetitions associated with two sets of transmission parameters, the DMRSs 225 that belong to the same set are bundled (e.g., transmitted while maintaining a phase coherency between transmissions). More particularly, phase coherency is maintained, by the UE 115-a, for DMRSs across the repetitions associated with the same set of transmission parameters. As such, the base station 105-a, with one or more TRPs, may perform joint/coherent channel estimation across the repetitions that belong to the same set. This technique may be applicable to Type A and Type B PUSCH repetition and inter-slot or intra-slot PUCCH repetition.

In some examples, the UE 115-a may not be capable of maintaining phase coherency across non-contiguous repetitions. In such cases, the DMRS bundling may be further dependent on the mapping pattern for the repetitions in the first and second set. For a cyclic mapping pattern, since there may be no contiguous repetitions of the same set, the UE 115-a may not be able to bundle the DMRS 225 transmissions. For a sequential mapping pattern, the DMRS 225 transmissions may be bundled across two repetitions that are contiguous and belong to the same set. For a half-half mapping pattern, DMRS 225 transmissions may be bundled across each repetition that belong to the same set. This technique may maximize the number of repetitions with bundled DMRS 225 transmissions, when the UE 115-a is incapable of supporting phase coherency across non-contiguous repetitions of the same set.

These techniques may be similarly applicable when the UE 115-a is configured with a frequency hopping configuration for PUSCH or PUCCH repetitions. In such cases, the UE 115-a may be configured to transmit a first set of repetitions at a first frequency and a second set of repetitions at a second frequency. If the UE 115-a is capable of maintaining phase coherency in non-contiguous repetitions of the same set, then the UE 115-a may maintain the respective phase coherencies for the DMRS 225 transmissions at each frequency. In some cases, the UE 115-a is configured to alternate between the frequencies in a cyclic pattern. In such cases, if the UE 115-a is unable to maintain phase coherency for non-contiguous repetitions in the same frequency, then the UE 115-a may transmit the DMRSs 225 without maintaining phase coherency (e.g., without bundling). In some cases, the frequency hopping for UE 115-a may be configured in a sequential or half-half pattern. In such cases, the UE 115-a may maintain the phase coherency for DMRS 225 transmissions corresponding to contiguous repetitions at the same frequency. These frequency hopping configurations are described in further detail with respect to FIG. 4.

Figure 3:
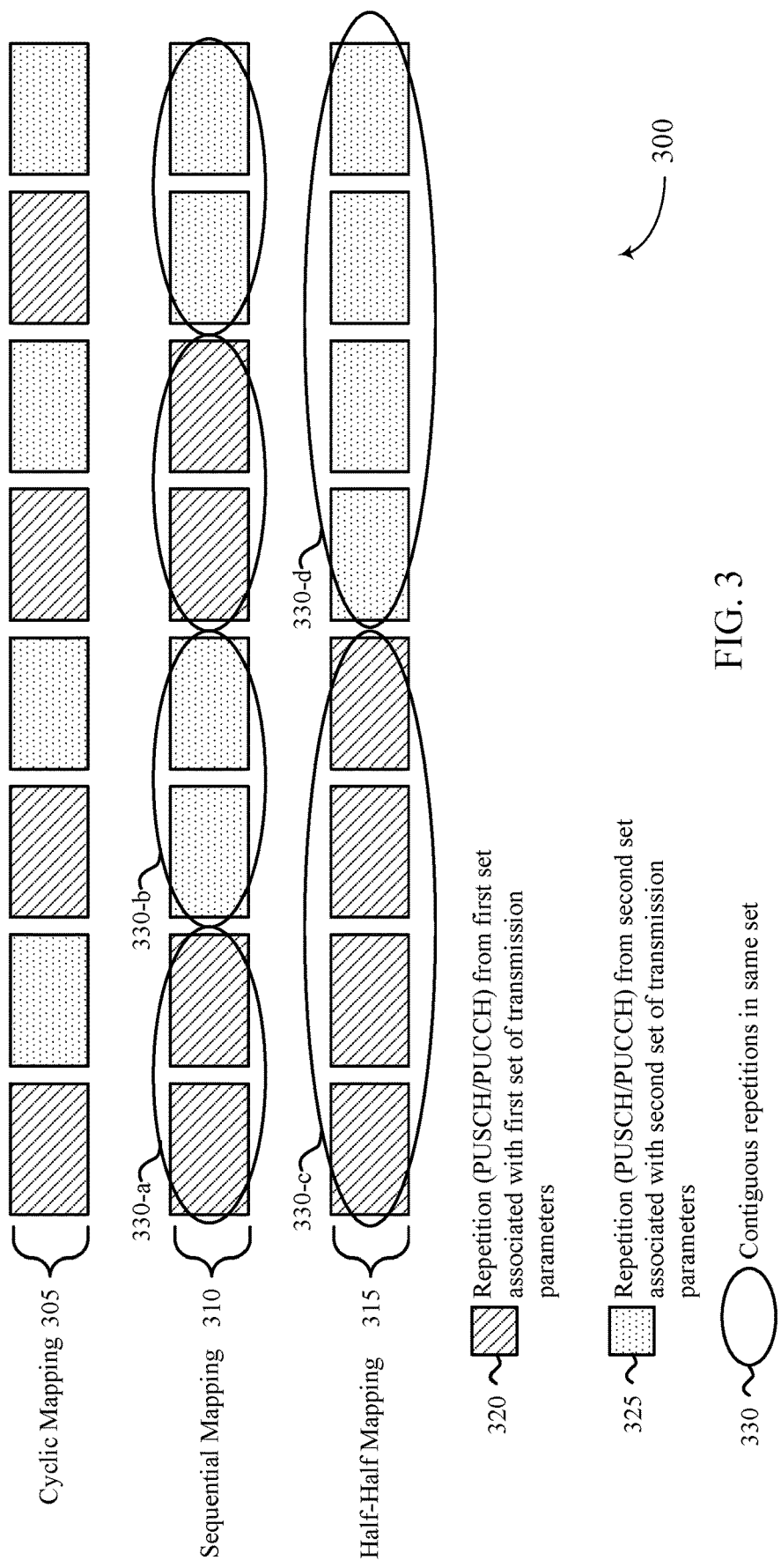
FIG. 3 illustrates examples of repetition mapping patterns that support reference signal bundling for uplink channel repetition in accordance with aspects of the present disclosure.

FIG. 3 illustrates examples of repetition mapping schemes 300 that support reference signal bundling for uplink channel repetition in accordance with aspects of the present disclosure. The repetition mapping schemes 300 may be used by a UE 115 for PUSCH or PUCCH repetitions, as described with respect to FIGS. 1 and 2. In some cases, one of the repetition mapping patterns may be configured at the UE 115 by a base station 105 using control signaling, such as RRC signaling. As described herein, a UE 115 may also be configured to perform PUSCH or PUCCH bundling (e.g., via control signaling, such as RRC signaling). If the UE 115 is configured for DMRS bundling and receives a control message scheduling PUSCH or PUCCH repetitions including two sets of repetitions associated with two sets of transmission parameters, then the DMRSs of the PUSCH/PUCCH repetitions belonging to the same set may be bundled. As described herein, the transmission parameters may include an uplink beam, an uplink transmit power (e.g., uplink power control parameters, such as alpha, P0, PL-RS, closed loop index), precoding (e.g., TPMI for PUSCH).

If the UE 115 is capable of maintaining phase coherency across non-contiguous repetitions of the same set, then the UE 115 may maintain respective phase coherency for the respective sets, irrespective of the repetition mapping scheme (also referred to as a mapping pattern herein). For example, the UE 115 may be configured to transmit the repetitions according to a cyclic mapping scheme 305, a sequential mapping scheme 310, or a half-half mapping scheme 315. It should be understood that other mapping schemes are contemplated within the scope of the present disclosure. Each mapping scheme illustrates a pattern of PUSCH or PUCCH repetitions from a first set (e.g., a repetition 320) associated with a first set of transmission parameters and a second set (e.g., a repetition 325) associated with a second set of transmission parameters.

In accordance with the cyclic mapping scheme 305, the UE 115 is to alternate between the first repetition 320 and the second repetition 325. As described, if the UE 115 is able to maintain the phase coherency across the non-contiguous repetitions of the sets, then the UE 115 may maintain a first phase coherency for the DMRS transmissions corresponding to each first repetition 320 of the first set in the cyclic mapping scheme 305. Further, the UE 115-a may maintain a separate, second phase coherency for the DMRS transmissions corresponding to each second repetition 325 of the second set in the cyclic mapping scheme 305. That is, the DMRSs corresponding to each repetition 320 are bundled, and the DMRSs corresponding to each repetition 325 are bundled. If the UE 115 is unable to maintain the phase coherency across non-contiguous repetitions, then the UE 115 may not bundle DMRSs in the cyclic mapping scheme 305.

In accordance with the sequential mapping scheme 310, the UE 115 is to transmit two repetitions 320 corresponding to the first set followed by two repetitions 325 of the second set and repeat this pattern for the remaining repetitions. If the UE 115 is able to maintain the phase coherency across the non-contiguous repetitions of the sets, then the UE 115 may maintain a first phase coherency for the DMRS transmissions corresponding to each first repetition 320 of the first set in the sequential mapping scheme 310. Further, the UE 115 may maintain a separate, second phase coherency for the DMRS transmissions corresponding to each second repetition 325 of the second set in the cyclic mapping scheme 305. That is, the DMRSs corresponding to each repetition 320 are bundled, and the DMRSs corresponding to each repetition 325 are bundled. If the UE 115 is unable to maintain the phase coherency across non-contiguous repetitions, then the UE 115 may bundle DMRSs corresponding to contiguous repetitions 330 in the same set. Thus, DMRSs corresponding contiguous repetitions 330-a may be bundled, and the DMRSs corresponding to contiguous repetitions 330-b may be bundled. The DMRSs corresponding to the remaining sets of contiguous repetitions 330 of the sequential mapping scheme 310 may be similarly bundled.

In some cases, a sequential mapping scheme 310 may include more than two contiguous repetitions of the same set, and the DMRS bundling may be similarly applicable.

In accordance with the half-half mapping scheme 315, the UE 115 is to transmit the first half of repetitions 320 corresponding to the first set of parameters and the second half of repetitions 325 corresponding to the second set of parameters. The UE 115 may maintain a first phase coherency for the DMRS transmissions corresponding to each repetition 320 of the first set since each repetition is a contiguous repetition 330-c in the half-half mapping scheme 315. Further, the UE 115-b may maintain a second phase coherency for the DMRS transmissions corresponding to each repetition 325 of the second set, since each repetition is a contiguous repetition 330-d in the half-half mapping scheme 315.

A base station 105 that receives the repetitions according the respective mapping scheme may combine one or more DMRSs of the same set, depending on the UE capability and configuration. For example, if the UE 115 is able to maintain phase coherency across non-contiguous repetitions, then the base station 105 may combine DMRSs from the same set of repetitions for each of the mapping schemes. If the UE 115 is unable to maintain the phase coherency for non-contiguous repetitions, then the base station 105 may not combine DMRS transmissions when the cyclic mapping scheme 305 is used. If the sequential mapping scheme 310 or the half-half mapping scheme 315 is used, then the base station may combine DMRSs from contiguous repetitions of the same set.

Figure 4:
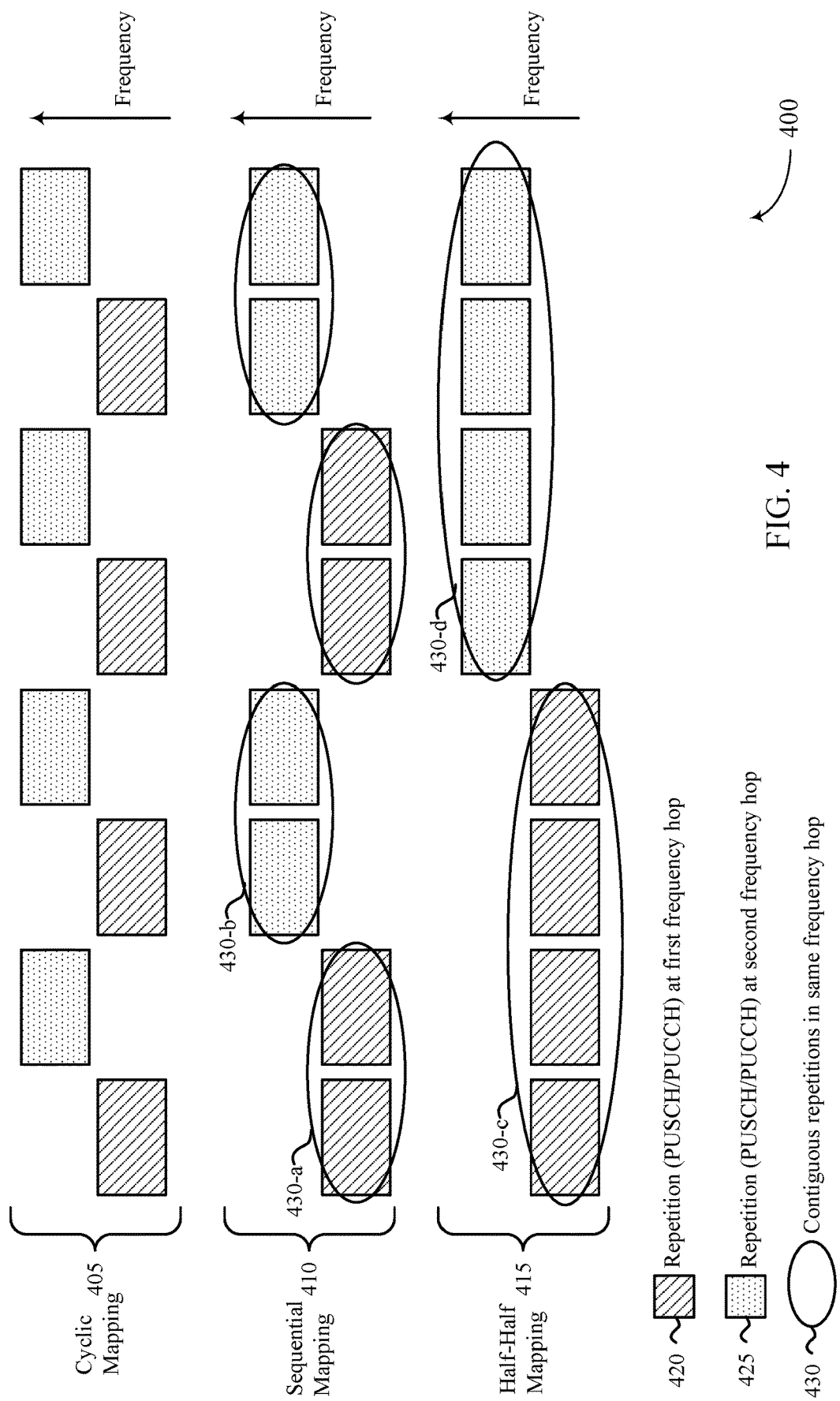
FIG. 4 illustrates an example frequency hopping repetition mapping schemes that supports reference signal bundling for uplink channel repetition in accordance with aspects of the present disclosure.

FIG. 4 illustrates examples of frequency hopping repetition mapping schemes 400 that support reference signal bundling for uplink channel repetition in accordance with aspects of the present disclosure. The frequency hopping repetition mapping schemes 400 may be used by a UE 115 for PUSCH or PUCCH repetitions, as described with respect to FIGS. 1 and 2. For example, inter-repetition frequency hopping may be configured for both PUSCH repetitions and PUCCH repetitions. In such cases, even repetitions may be transmitted using a first frequency hop (e.g., at a first frequency) and odd repetitions may be transmitted using a second frequency hop (e.g., at a second frequency). This frequency hopping pattern may be similar to the cyclic mapping scheme 305 as described with respect to FIG. 3 and as illustrated by cyclic mapping scheme 405. In some cases, the cyclic mapping scheme 405 may be the default pattern when frequency hopping is configured or activated at the UE 115.

According to techniques described herein, if the UE 115 is configured with PUSCH/PUCCH DMRS bundling and the UE 115 receives a control message (e.g., RRC or DCI) scheduling PUSCH/PUCCH repetitions with frequency hopping enabled, then the UE 115 may bundle the DMRSs corresponding to PUSCH or PUCCH repetitions transmitted in the same frequency hop. For example, the UE 115 may bundle the DMRSs corresponding to each repetition 420 transmitted at the first frequency hop and separately bundle the DMRSs corresponding to each repetition 425 transmitted at the second frequency hop. As such, a base station 105 may perform joint/coherent channel estimation using the DMRSs of the same frequency hop. These techniques may be applicable to Type A PUSCH repetitions, Type B PUSCH repetitions, inter-slot PUCCH repetitions, or intra-slot PUCCH repetitions.

Further, for inter-repetition frequency hopping, the UE 115 may be configured with a mapping scheme of a cyclic mapping scheme 405, a sequential mapping scheme 410, or a half-half mapping scheme 415. It should be understood that other mapping schemes are contemplated within the scope of the present disclosure. For the cyclic mapping scheme 405, the first repetition 420 and second repetition 425 are transmitted using the first and second frequency, respectively, and the same frequency hopping mapping pattern may continue for the remaining repetitions. If the UE 115 is capable, then the UE 115 may maintain a first phase coherency for the DMRSs corresponding to each repetition 420 and a second phase coherency for the DMRSs corresponding to each repetition 425 in the cyclic mapping scheme 405.

The UE 115 may be configured with sequential mapping scheme 410 for frequency hopping with PUSCH or PUCCH repetitions. In accordance with the sequential mapping scheme 410 for frequency hopping, two first repetitions 420 and two second repetitions 425 are to be transmitted using the first and second frequency hops, respectively, and the same frequency hopping mapping pattern may continue for the remaining repetitions. If the UE 115 is capable, then the UE 115 may maintain a first phase coherency for the DMRSs corresponding to each repetition 420 and a second phase coherency for the DMRSs corresponding to each repetition 425 in the sequential mapping scheme 410.

The UE 115 may also be configured with half-half mapping scheme 415 for frequency hopping with PUSCH or PUCCH repetitions. In accordance with the half-half mapping scheme 415 for frequency hopping, the first half of repetitions 420 are to be transmitted using the first frequency hop, and the second half of repetitions 425 are to be transmitted using the second frequency hop. The UE 115 may maintain a first phase coherency for the DMRSs corresponding to each repetition 420 and a second phase coherency for the DMRSs corresponding to each repetition 425 in the half-half mapping scheme 415.

If a UE 115 is not capable of maintaining phase coherency across non-contiguous repetitions, DMRS bundling is further conditioned on mapping schemes, which may be similar to the transmission parameter configuration schemes, as described with respect to FIG. 3. For the cyclic mapping scheme 405, the UE 115 may not perform DMRS bundling. For the sequential mapping scheme, the DMRSs may be bundled across two repetitions that are contiguous and transmitted using the same frequency hop. For example, the DMRSs corresponding to contiguous repetitions 430-a may be bundled, and the DMRSs corresponding to contiguous repetitions 430-b may be bundled. DMRSs corresponding to contiguous repetitions 430 at the same frequency hop for remaining repetitions may be similarly bundled.

For the half-half mapping scheme 415, the DMRSs may be bundled across the repetitions using the same frequency hop. This scheme may maximize repetitions with bundled DMRSs. As such, DMRSs corresponding to the contiguous repetitions 430-c may be bundled, and the DMRSs corresponding to the contiguous repetitions 430-d may be bundled. The receiving base station 105 may combine bundled DMRS s transmitted at the same frequency hop in order to support joint/coherent channel estimation.

Figure 5:
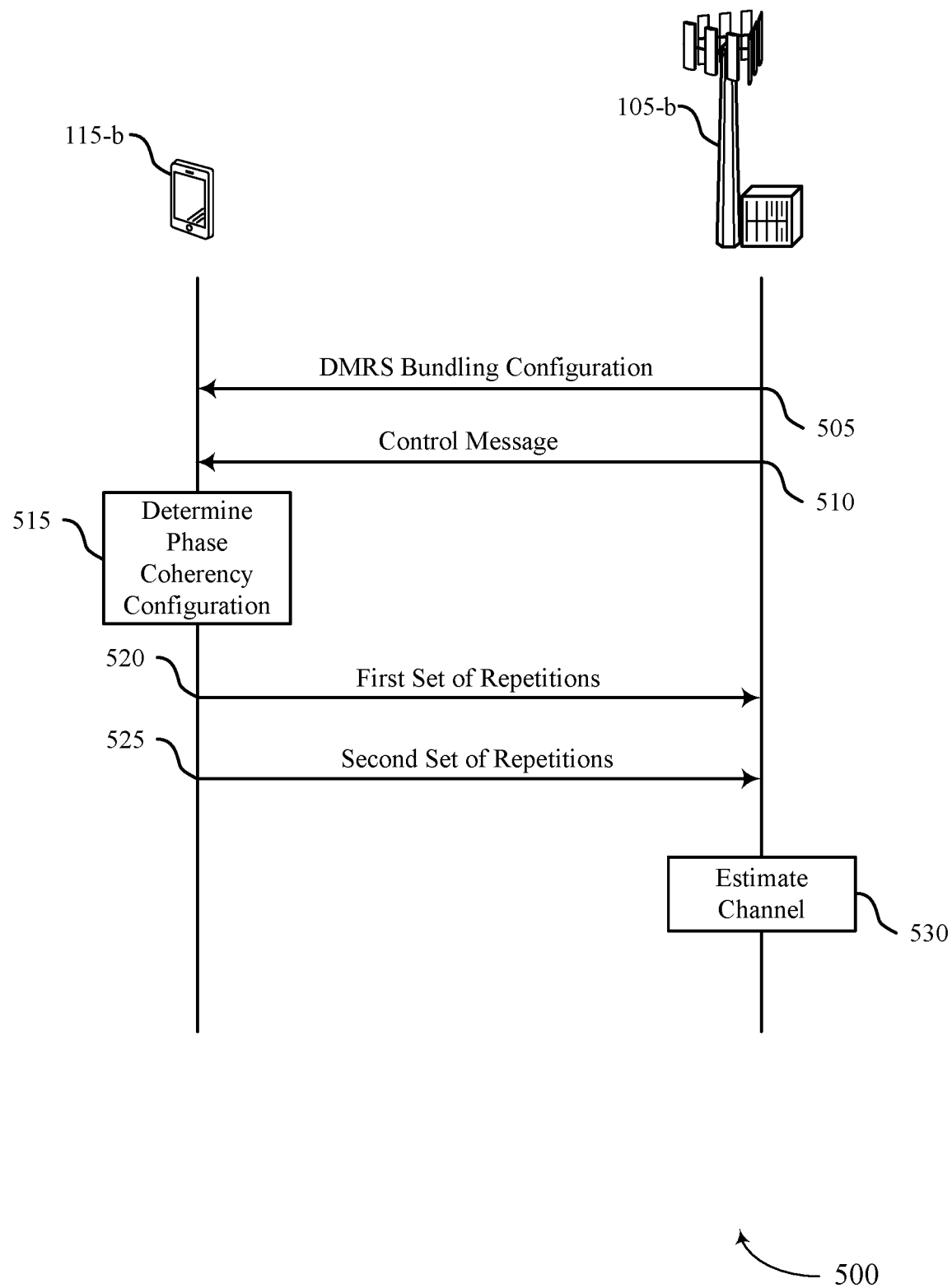
FIG. 5 illustrates an example of a process flow diagram that illustrates reference signal bundling for uplink channel repetition in accordance with aspects of the present disclosure.

FIG. 5 illustrates an example of a process flow diagram 500 that illustrates reference signal bundling for uplink channel repetition in accordance with aspects of the present disclosure. The process flow diagram 500 includes a UE 115-b and a base station 105-b, which may be examples of the corresponding devices described with respect to FIGS. 1 and 2. The UE 115-b and the base station 105-b may support DMRS bundling and uplink channel repetitions, as described herein.

At 505, the UE 115-a may receive, from the base station 105-b, a DMRS bundling configuration that is indicative that the UE is to maintain phase coherency for uplink communications. The bundling configuration may be received in a control message, such as an RRC message, DCI message, or MAC-CE message.

At 510, the UE 115-a may receive one or more control messages scheduling a first set of repetitions of an uplink transmission and a second set of repetitions of the uplink transmission. The one or more control messages may schedule a PUSCH repetition Type A, a PUSCH repetition Type B, an inter-slot PUCCH repetition, an intra-slot PUCCH repetition, or a combination thereof. A number of repetitions, K, may be semi-statically configured via RRC messaging or dynamically indicated via DCI (e.g., via a TDRA field). A number of nominal repetitions (e.g., for Type B PUSCH repetition) may be indicated via DCI, and a number of actual repetitions may be determined by the UE 115-b. In some examples, the one or more control messages may indicate two sets of transmission parameters corresponding to the sets of repetitions. In some cases, the one or more control messages may activate frequency hopping for the sets of repetitions. The one or more control messages may also indicate a mapping scheme, such as a cyclic mapping scheme, sequential mapping scheme, or half-half mapping scheme, that the UE 115-a is to use for the sets of repetitions. In some examples, the mapping scheme may be a scheme to use for frequency hopping.

At 515, the UE 115-b may determine a phase coherency configuration to be applied to transmission of the first set of repetitions and a corresponding first set of demodulation reference signals and to transmission of the second set of repetitions and a corresponding second set of demodulation reference signals. The phase coherency configuration may be determined based at least in part on a phase coherency capability of the UE and may specify that phase coherency is to be maintained for one or more of the first set of repetitions separate from one or more of the second set of repetitions. The UE 115-a may determine to maintain first phase coherency across DMRS transmissions for each repetition of the first set and separately maintain a second phase coherency across DMRS transmissions for each repetition of the second set. This determination may be based on the UE 115-b being capable of maintaining phase coherency across non-contiguous repetitions. In some examples, the UE 115-b is unable to maintain a phase coherency across non-contiguous repetitions. In such cases, the phase coherency configuration may be based on the repetition pattern or scheme indicated by the one or more control messages. For a cyclic mapping scheme (frequency hopping or repetitions corresponding to respective sets of transmission patterns), the UE 115-b may determine to not maintain a phase coherency. For a sequential or half-half mapping scheme, the UE 115-b may determine to maintain a phase coherency for the DMRSs corresponding to contiguous repetitions of the same set or frequency hop.

At 520, the UE 115-b may transmit the first set of repetitions with the first set of DMRSs, and at 525, the UE 115-b may transmit the second set of repetitions with the second set of DMRSs. The first and second set of repetitions and corresponding DMRSs may be transmitted in accordance with the determined phase coherency configuration.

At 525, the base station 105-b may estimate the channel for the uplink transmission (e.g., PUSCH or PUCCH channel) by combining at least two received DMRSs corresponding to the first set of repetitions or corresponding to the second set of repetitions in accordance with the phase coherency configuration.

In some examples, the UE 115-b may indicate, to the base station 105-b, whether the UE 115-b is capable of supporting maintaining phase coherency for non-contiguous repetitions. In such cases, the base station 105-b may configure the repetition scheme based on the UE 115-b capability. In other examples, the base station 105-b may determine when the UE 115-b is able to bundle DMRSs based on the configured mapping scheme and the UE capability. Thus, the base station 105-b may determine when it may use bundled DMRSs for channel estimation.

Figure 6:
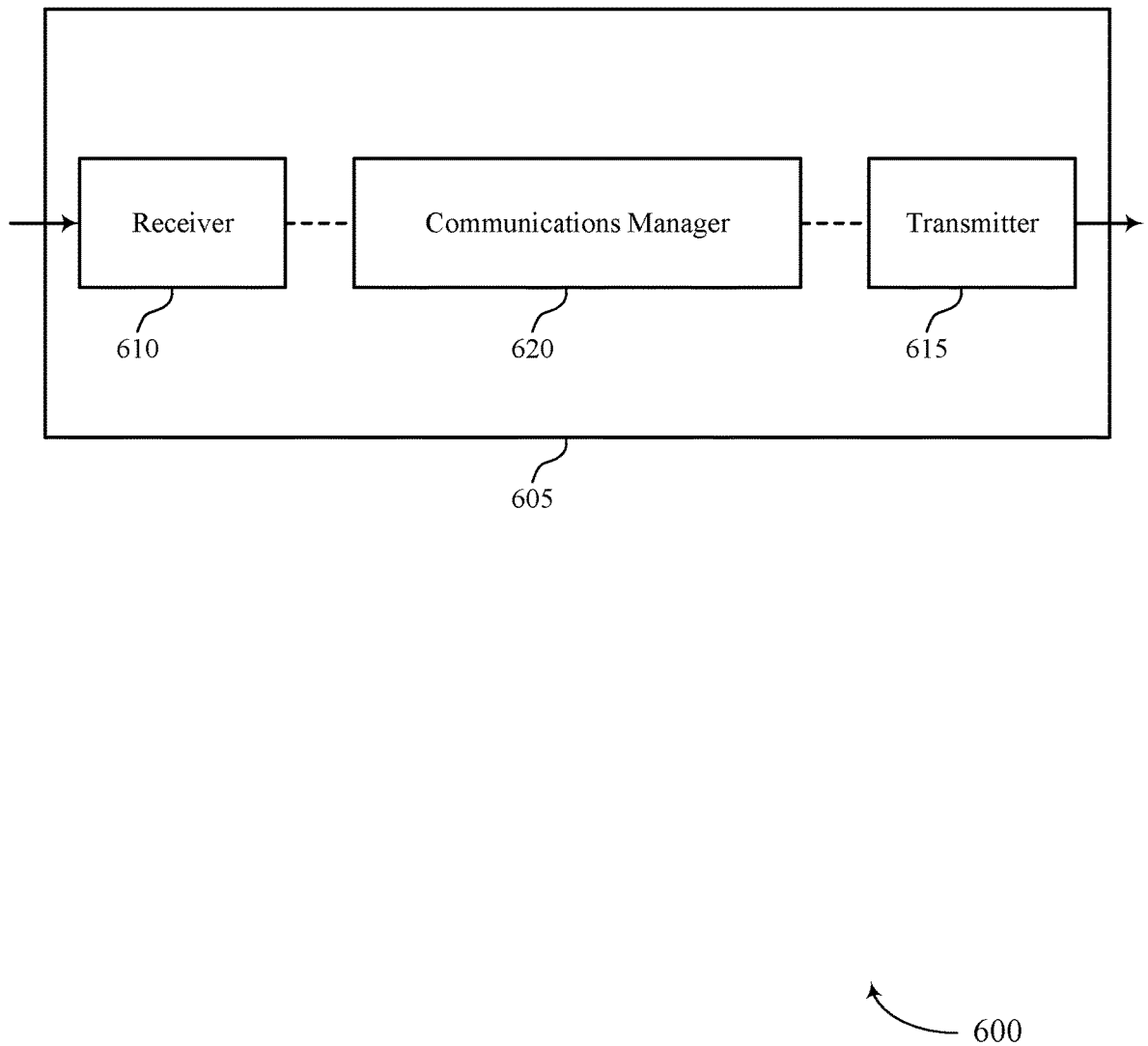
FIGS. 6 and 7 show block diagrams of devices that support reference signal bundling for uplink channel repetition in accordance with aspects of the present disclosure.

FIG. 6 shows a block diagram 600 of a device 605 that supports reference signal bundling for uplink channel repetition in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reference signal bundling for uplink channel repetition). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reference signal bundling for uplink channel repetition). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reference signal bundling for uplink channel repetition as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving one or more control messages scheduling a first set of repetitions of an uplink transmission and a second set of repetitions of the uplink transmission. The communications manager 620 may be configured as or otherwise support a means for determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The communications manager 620 may be configured as or otherwise support a means for transmitting the first set of repetitions with the first set of demodulation reference signals and the second set of repetitions with the second set of demodulation reference signals in accordance with the phase coherency configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources. By determining a phase coherency configuration for first and second sets of uplink repetitions, the device 605 may transmit DMRSs corresponding to the uplink transmissions such that the DMRSs may be combined for channel estimation. This technique may support reduced processing (e.g., by maintaining phase coherency, when possible) and efficient communication for various devices.

Figure 7:
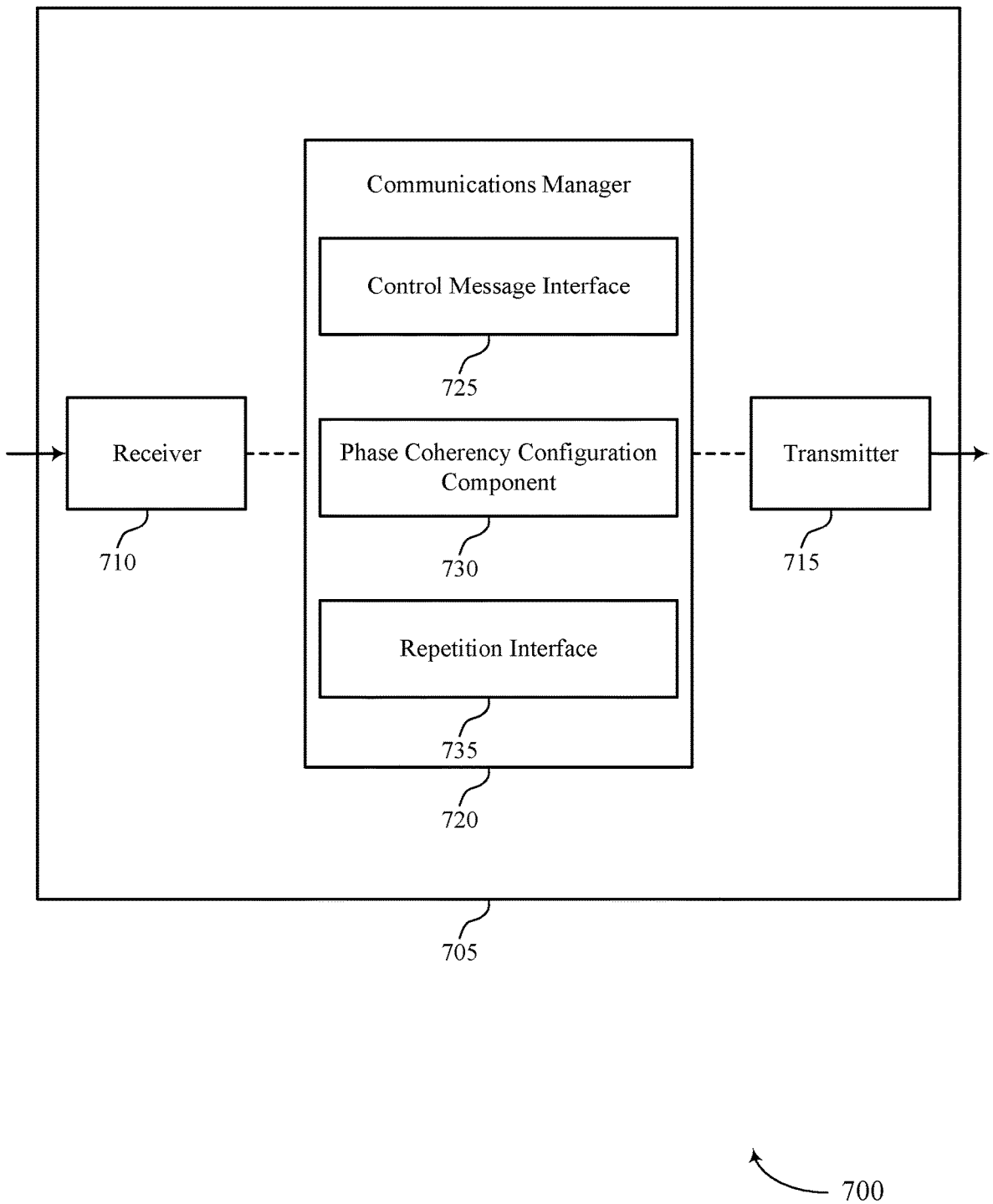

FIG. 7 shows a block diagram 700 of a device 705 that supports reference signal bundling for uplink channel repetition in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reference signal bundling for uplink channel repetition). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reference signal bundling for uplink channel repetition). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reference signal bundling for uplink channel repetition as described herein. For example, the communications manager 720 may include a control message interface 725, a phase coherency configuration component 730, a repetition interface 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The control message interface 725 may be configured as or otherwise support a means for receiving one or more control messages scheduling a first set of repetitions of an uplink transmission and a second set of repetitions of the uplink transmission. The phase coherency configuration component 730 may be configured as or otherwise support a means for determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The repetition interface 735 may be configured as or otherwise support a means for transmitting the first set of repetitions with the first set of demodulation reference signals and the second set of repetitions with the second set of demodulation reference signals in accordance with the phase coherency configuration.

Figure 8:
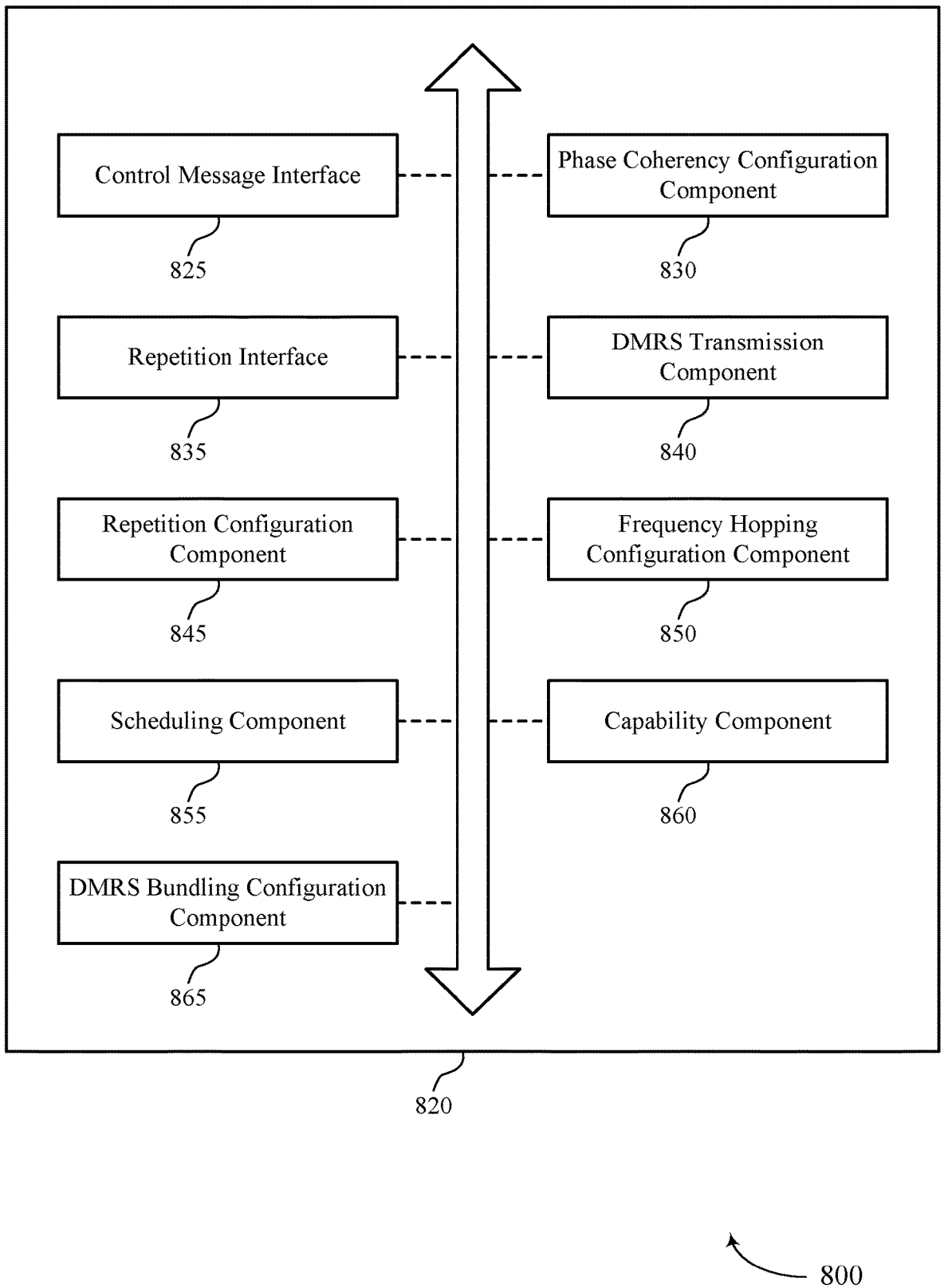
FIG. 8 shows a block diagram of a communications manager that supports reference signal bundling for uplink channel repetition in accordance with aspects of the present disclosure.

FIG. 8 shows a block diagram 800 of a communications manager 820 that supports reference signal bundling for uplink channel repetition in accordance with aspects of the present disclosure. The communications manager 820 may be an example of aspects of a communications manager 620, a communications manager 720, or both, as described herein. The communications manager 820, or various components thereof, may be an example of means for performing various aspects of reference signal bundling for uplink channel repetition as described herein. For example, the communications manager 820 may include a control message interface 825, a phase coherency configuration component 830, a repetition interface 835, a DMRS transmission component 840, a repetition configuration component 845, a frequency hopping configuration component 850, a scheduling component 855, a capability component 860, a DMRS bundling configuration component 865, or any combination thereof. Each of these components may communicate, directly or indirectly, with one another (e.g., via one or more buses).

The communications manager 820 may support wireless communications at a UE in accordance with examples as disclosed herein. The control message interface 825 may be configured as or otherwise support a means for receiving one or more control messages scheduling a first set of repetitions of an uplink transmission and a second set of repetitions of the uplink transmission. The phase coherency configuration component 830 may be configured as or otherwise support a means for determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The repetition interface 835 may be configured as or otherwise support a means for transmitting the first set of repetitions with the first set of demodulation reference signals and the second set of repetitions with the second set of demodulation reference signals in accordance with the phase coherency configuration.

In some examples, the DMRS transmission component 840 may be configured as or otherwise support a means for maintaining a first phase coherency for each demodulation reference signal transmission corresponding to the first set of repetitions in accordance with the phase coherency configuration. In some examples, the DMRS transmission component 840 may be configured as or otherwise support a means for maintaining a second phase coherency for each demodulation reference signal transmission corresponding to the second set of repetitions in accordance with the phase coherency configuration.

In some examples, the control message interface 825 may be configured as or otherwise support a means for receiving a control message that is indicative of a mapping scheme that the UE is to use for transmitting the one or more of the first set of repetitions and the one or more of the second set of repetitions, where the phase coherency configuration is determined based on the mapping scheme.

In some examples, the mapping scheme is one of a cyclic mapping scheme, a sequential mapping scheme, or a half-half mapping scheme.

In some examples, the repetition configuration component 845 may be configured as or otherwise support a means for determining that the UE is to transmit the first set of repetitions and the second set of repetitions according to a cyclic mapping scheme such that the one or more of the first set of repetitions and the one or more of the second set of repetitions are to be transmitted in an alternating order. In some examples, the DMRS transmission component 840 may be configured as or otherwise support a means for transmitting each demodulation reference signal transmission for the first set of repetitions without maintaining a phase coherency in accordance with the phase coherency configuration. In some examples, the DMRS transmission component 840 may be configured as or otherwise support a means for transmitting each demodulation reference signal transmission for the second set of repetitions without maintaining the phase coherency in accordance with the phase coherency configuration.

In some examples, the DMRS transmission component 840 may be configured as or otherwise support a means for maintaining a first phase coherency for demodulation reference signal transmissions corresponding to contiguous first repetitions of the first set of repetitions in accordance with the phase coherency configuration. In some examples, the DMRS transmission component 840 may be configured as or otherwise support a means for maintaining a second phase coherency for demodulation reference signal transmissions corresponding to contiguous second repetitions of the second set of repetitions in accordance with the phase coherency configuration.

In some examples, the DMRS transmission component 840 may be configured as or otherwise support a means for maintaining the first phase coherency across demodulation reference signal transmissions corresponding to each contiguous set of first repetitions of the first set of repetitions in accordance with the phase coherency configuration. In some examples, the DMRS transmission component 840 may be configured as or otherwise support a means for maintaining the second phase coherency across demodulation reference signal transmissions corresponding to each contiguous set of second repetitions of the second set of repetitions in accordance with the phase coherency configuration.

In some examples, to support receiving the one or more control messages, the control message interface 825 may be configured as or otherwise support a means for receiving a control message that specifies that the UE is to use a sequential mapping scheme such that two first repetitions of the first set of repetitions are to be transmitted contiguously and two second repetitions of the second set of repetitions are to be transmitted contiguously.

In some examples, to support receiving the one or more control messages, the control message interface 825 may be configured as or otherwise support a means for receiving a control message that specifies that the UE is to use a half-half mapping such that the first set of repetitions are to be transmitted contiguously, and the second set of repetitions are to be transmitted contiguously.

In some examples, to support receiving the one or more control messages, the control message interface 825 may be configured as or otherwise support a means for receiving a control message that indicates that the UE is to use a first set of transmission parameters for transmitting the first set of repetitions and is to use a second set of transmission parameters for transmitting the second set of repetitions, where the first set of repetitions and the corresponding first set of demodulation reference signals are transmitted according to the first set of transmission parameters and the second set of repetitions and the corresponding second set of demodulation reference signals are transmitted according to the second set of transmission parameters.

In some examples, the first set of transmission parameters and the second set of transmission parameters include one or more an uplink beam, at least one uplink power control parameter, and a precoding. In some examples, at least one value for the second set of transmission parameters is different from a corresponding value for the first set of transmission parameters.

In some examples, the control message interface 825 may be configured as or otherwise support a means for receiving a control message that indicates that the UE is to use frequency hopping such that the UE is to transmit the first set of repetitions at a first frequency and the second set of repetitions at a second frequency, where the phase coherency configuration is determined based on the indication that the UE is to use the frequency hopping.

In some examples, the frequency hopping configuration component 850 may be configured as or otherwise support a means for determining that the UE is to transmit the first set of repetitions at a first frequency and the second set of repetitions at a second frequency. In some examples, the DMRS transmission component 840 may be configured as or otherwise support a means for maintaining a first phase coherency for each demodulation reference signal transmission corresponding to the first set of repetitions at the first frequency in accordance with the phase coherency configuration. In some examples, the DMRS transmission component 840 may be configured as or otherwise support a means for maintaining a second phase coherency for each demodulation reference signal transmission corresponding to the second set of repetitions at the second frequency in accordance with the phase coherency configuration.

In some examples, the phase coherency configuration component 830 may be configured as or otherwise support a means for determining that the UE is to transmit the first set of repetitions at a first frequency and the second set of repetitions at a second frequency. In some examples, the DMRS transmission component 840 may be configured as or otherwise support a means for transmitting each demodulation reference signal transmission corresponding to the first set of repetitions at the first frequency without maintaining a phase coherency in accordance with the phase coherency configuration. In some examples, the DMRS transmission component 840 may be configured as or otherwise support a means for transmitting each demodulation reference signal transmission corresponding to the second set of repetitions at the second frequency without maintaining the phase coherency in accordance with the phase coherency configuration.

In some examples, the frequency hopping configuration component 850 may be configured as or otherwise support a means for determining that the UE is to transmit the first set of repetitions at a first frequency and the second set of repetitions at a second frequency. In some examples, the DMRS transmission component 840 may be configured as or otherwise support a means for maintaining a first phase coherency for demodulation reference signal transmissions corresponding to contiguous first repetitions of the first set of repetitions at the first frequency in accordance with the phase coherency configuration. In some examples, the DMRS transmission component 840 may be configured as or otherwise support a means for maintaining a second phase coherency for demodulation reference signal transmissions corresponding to contiguous second repetitions of the second set of repetitions at the second frequency in accordance with the phase coherency configuration.

In some examples, the DMRS transmission component 840 may be configured as or otherwise support a means for maintaining the first phase coherency across demodulation reference signal transmissions and corresponding to each contiguous set of first repetitions of the first set of repetitions at the first frequency in accordance with the phase coherency configuration. In some examples, the DMRS transmission component 840 may be configured as or otherwise support a means for maintaining the second phase coherency across demodulation reference signal transmissions and corresponding to each contiguous set of second repetitions of the second set of repetitions at the second frequency in accordance with the phase coherency configuration.

In some examples, to support receiving the one or more control messages, the scheduling component 855 may be configured as or otherwise support a means for receiving a scheduling indication that schedules the first set of repetitions and the second set of repetitions of a physical uplink shared channel transmission, and the repetitions are to be transmitted using a type A configuration or a type B configuration, where the type A configuration indicates that consecutive repetitions are to be transmitted in consecutive slots and the type B configuration indicates that consecutive repetitions are consecutively transmitted across one or more slots.

In some examples, to support receiving the one or more control messages, the scheduling component 855 may be configured as or otherwise support a means for receiving a scheduling indication that schedules the first set of repetitions and the second set of repetitions of a physical uplink control channel transmission, and the repetitions are to be transmitted using an inter-slot configuration or an intra-slot configuration, where the inter-slot configuration indicates that consecutive repetitions are to be transmitted in consecutive slots and the intra-slot configuration indicates that consecutive repetitions are consecutively transmitted across one or more slots.

In some examples, the capability component 860 may be configured as or otherwise support a means for transmitting, by the UE, an indication of a UE capability to support maintaining a phase coherency across non-consecutive repetitions, where the one or more control messages are received based on the indication of the UE capability.

In some examples, the DMRS bundling configuration component 865 may be configured as or otherwise support a means for receiving a demodulation reference signal bundling configuration that is indicative that the UE is to maintain phase coherency for uplink communications, where the phase coherency configuration is determined based on receiving the demodulation reference signal bundling configuration.

Figure 9:
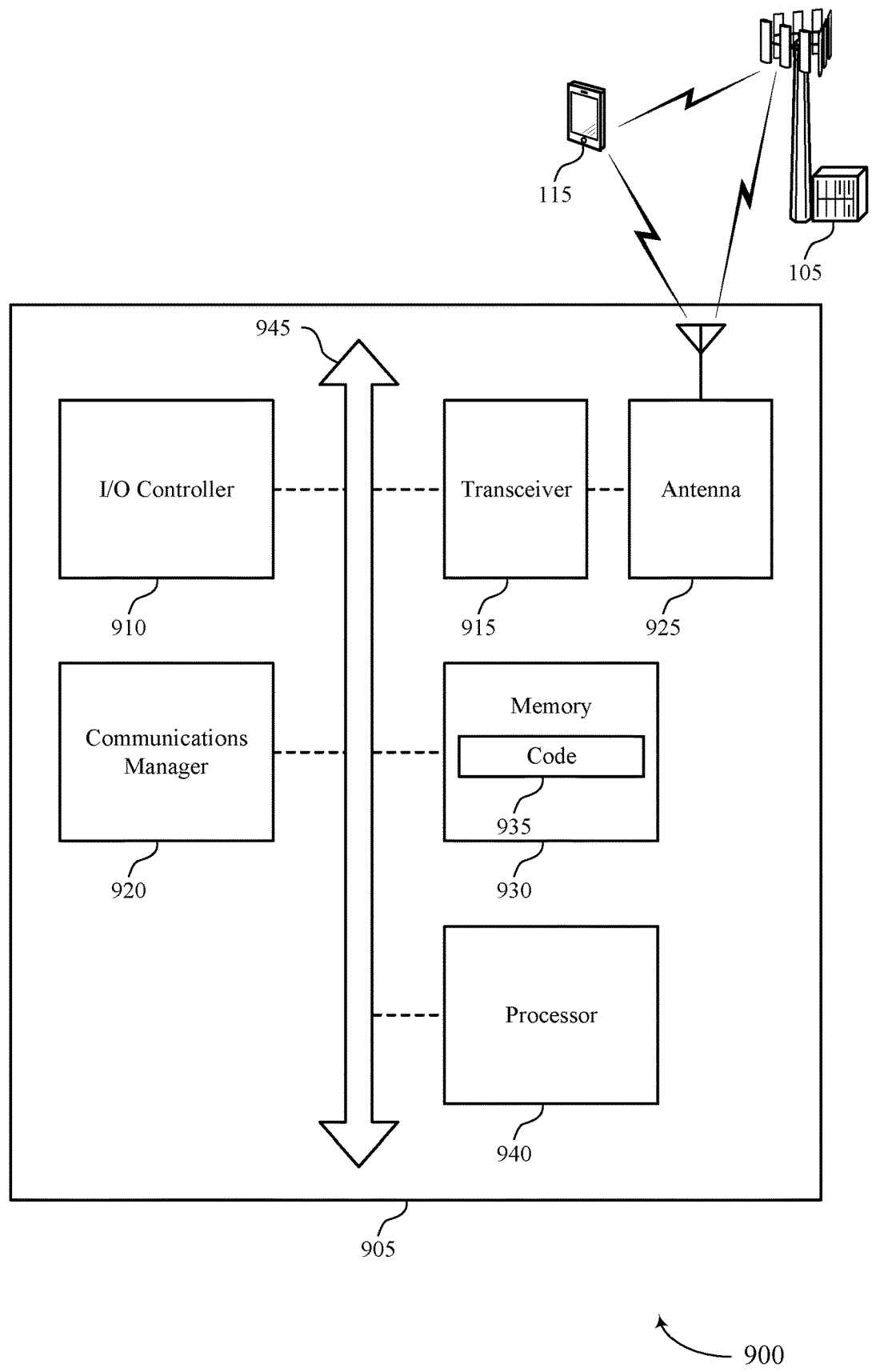
FIG. 9 shows a diagram of a system including a device that supports reference signal bundling for uplink channel repetition in accordance with aspects of the present disclosure.

FIG. 9 shows a diagram of a system 900 including a device 905 that supports reference signal bundling for uplink channel repetition in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reference signal bundling for uplink channel repetition). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving one or more control messages scheduling a first set of repetitions of an uplink transmission and a second set of repetitions of the uplink transmission. The communications manager 920 may be configured as or otherwise support a means for determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The communications manager 920 may be configured as or otherwise support a means for transmitting the first set of repetitions with the first set of demodulation reference signals and the second set of repetitions with the second set of demodulation reference signals in accordance with the phase coherency configuration.

By including or configuring the communications manager 920 in accordance with examples as described herein, the device 905 may support techniques for more efficient utilization of communication resources. By determining a phase coherency configuration for first and second sets of uplink repetitions, the device 605 may transmit DMRSs corresponding to the uplink transmissions such that the DMRSs may be combined for channel estimation. This technique may support reduced processing at the processor 940 (e.g., by maintaining phase coherency, when possible) and efficient communication for various devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reference signal bundling for uplink channel repetition as described herein, or the processor 940 and the memory 930 may be otherwise configured to perform or support such operations.

Figure 10:
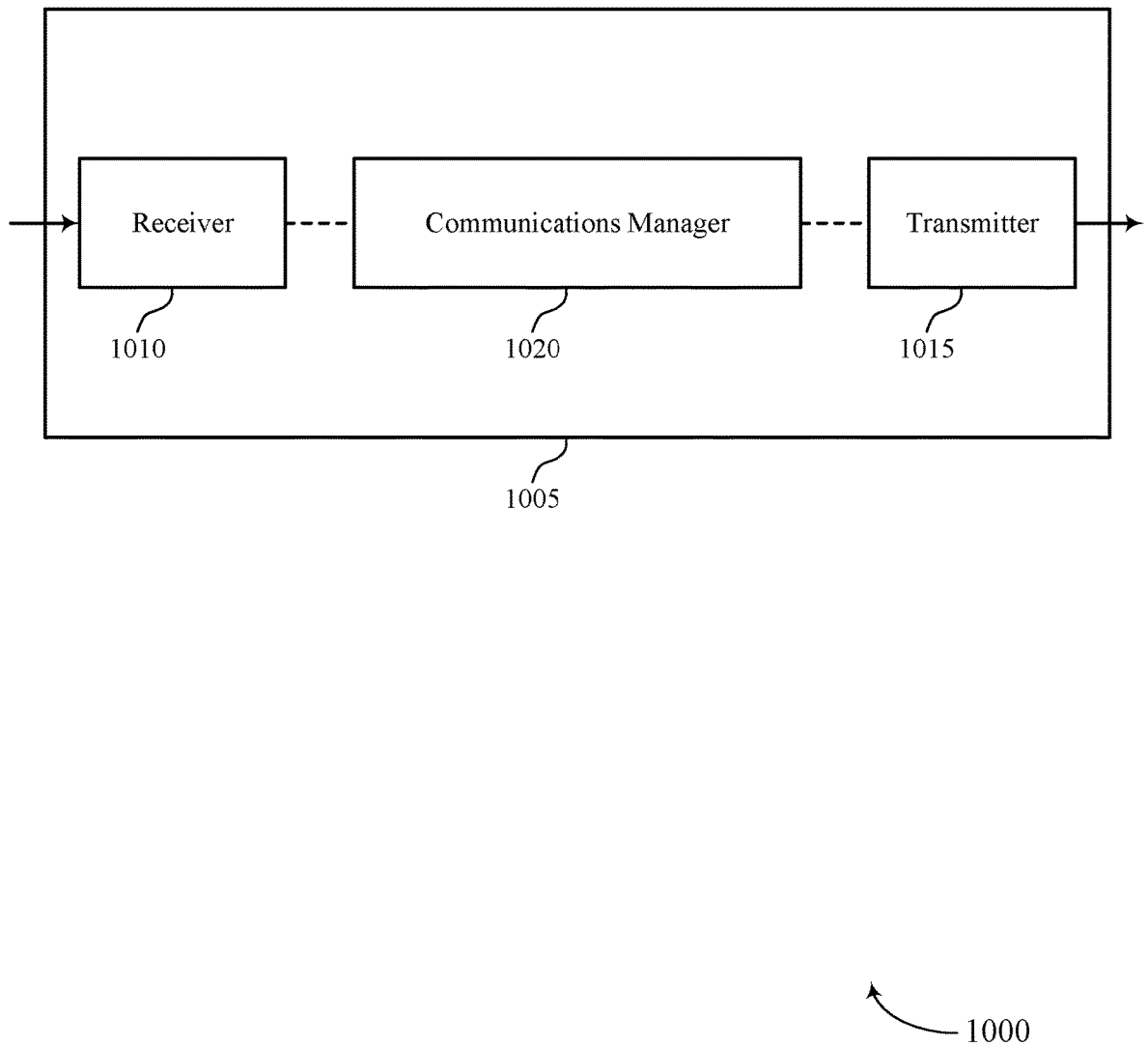
FIGS. 10 and 11 show block diagrams of devices that support reference signal bundling for uplink channel repetition in accordance with aspects of the present disclosure.

FIG. 10 shows a block diagram 1000 of a device 1005 that supports reference signal bundling for uplink channel repetition in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reference signal bundling for uplink channel repetition). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reference signal bundling for uplink channel repetition). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of reference signal bundling for uplink channel repetition as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, one or more control messages scheduling a first set of repetitions of an uplink transmission and a second set of repetitions of the uplink transmission in accordance with a repetition configuration. The communications manager 1020 may be configured as or otherwise support a means for determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions. The communications manager 1020 may be configured as or otherwise support a means for receiving one or both of the first set of repetitions with the first set of demodulation reference signals and the second set of repetitions with the second set of demodulation reference signals in accordance with the phase coherency configuration.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources. By determining a phase coherency configuration for first and second sets of uplink repetitions, the device 1005 may receive DMRSs corresponding to the uplink transmissions such that the DMRSs may be combined for channel estimation. This technique may support reduced processing by combining bundled DMRSs and efficient communication for various devices (e.g., the device 1005 may efficiently estimate the channel using bundled DMRSs).

Figure 11:
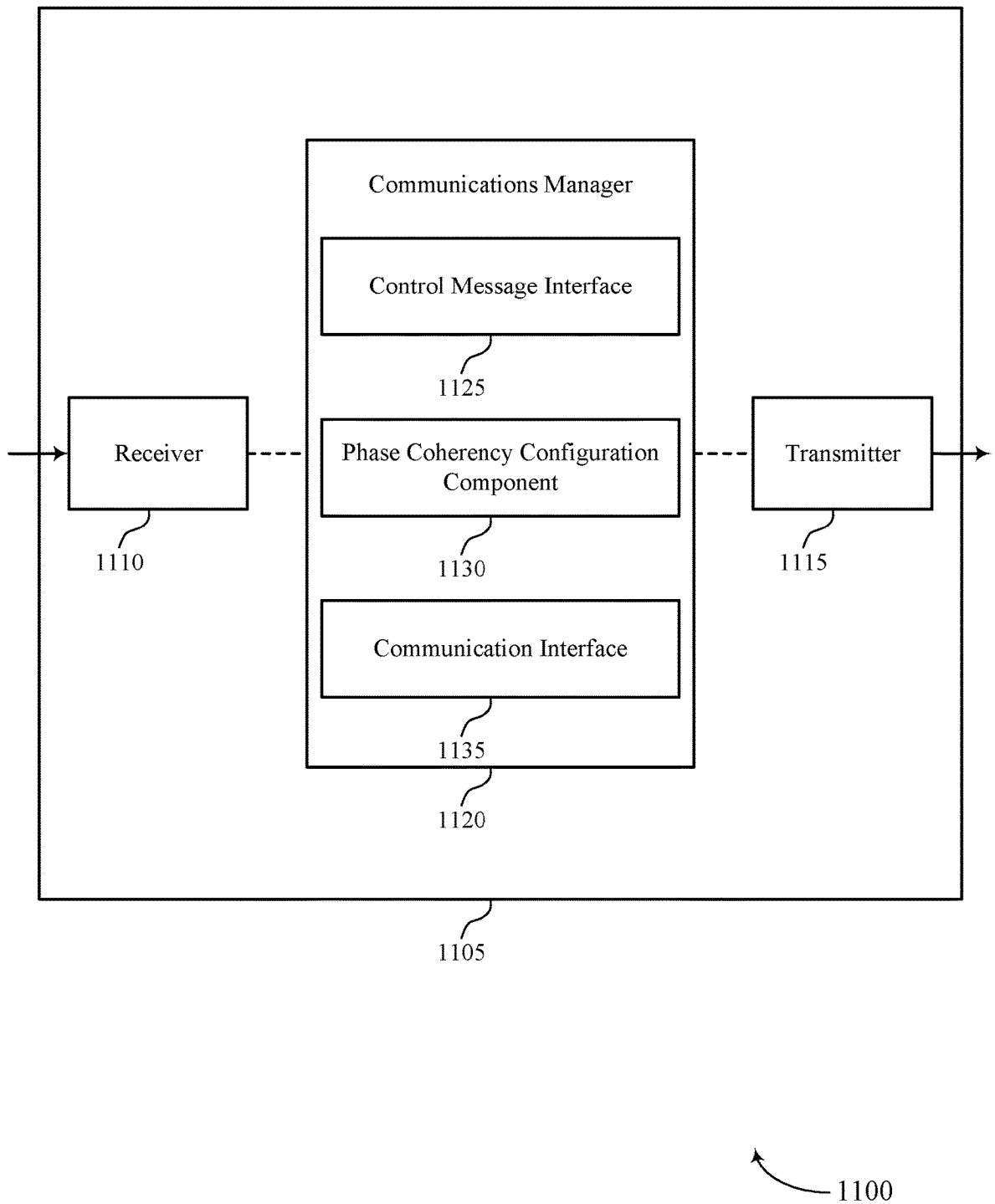

FIG. 11 shows a block diagram 1100 of a device 1105 that supports reference signal bundling for uplink channel repetition in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to reference signal bundling for uplink channel repetition). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to reference signal bundling for uplink channel repetition). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of reference signal bundling for uplink channel repetition as described herein. For example, the communications manager 1120 may include a control message interface 1125, a phase coherency configuration component 1130, a communication interface 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The control message interface 1125 may be configured as or otherwise support a means for transmitting, to a UE, one or more control messages scheduling a first set of repetitions of an uplink transmission and a second set of repetitions of the uplink transmission in accordance with a repetition configuration. The phase coherency configuration component 1130 may be configured as or otherwise support a means for determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions. The communication interface 1135 may be configured as or otherwise support a means for receiving one or both of the first set of repetitions with the first set of demodulation reference signals and the second set of repetitions with the second set of demodulation reference signals in accordance with the phase coherency configuration.

Figure 12:
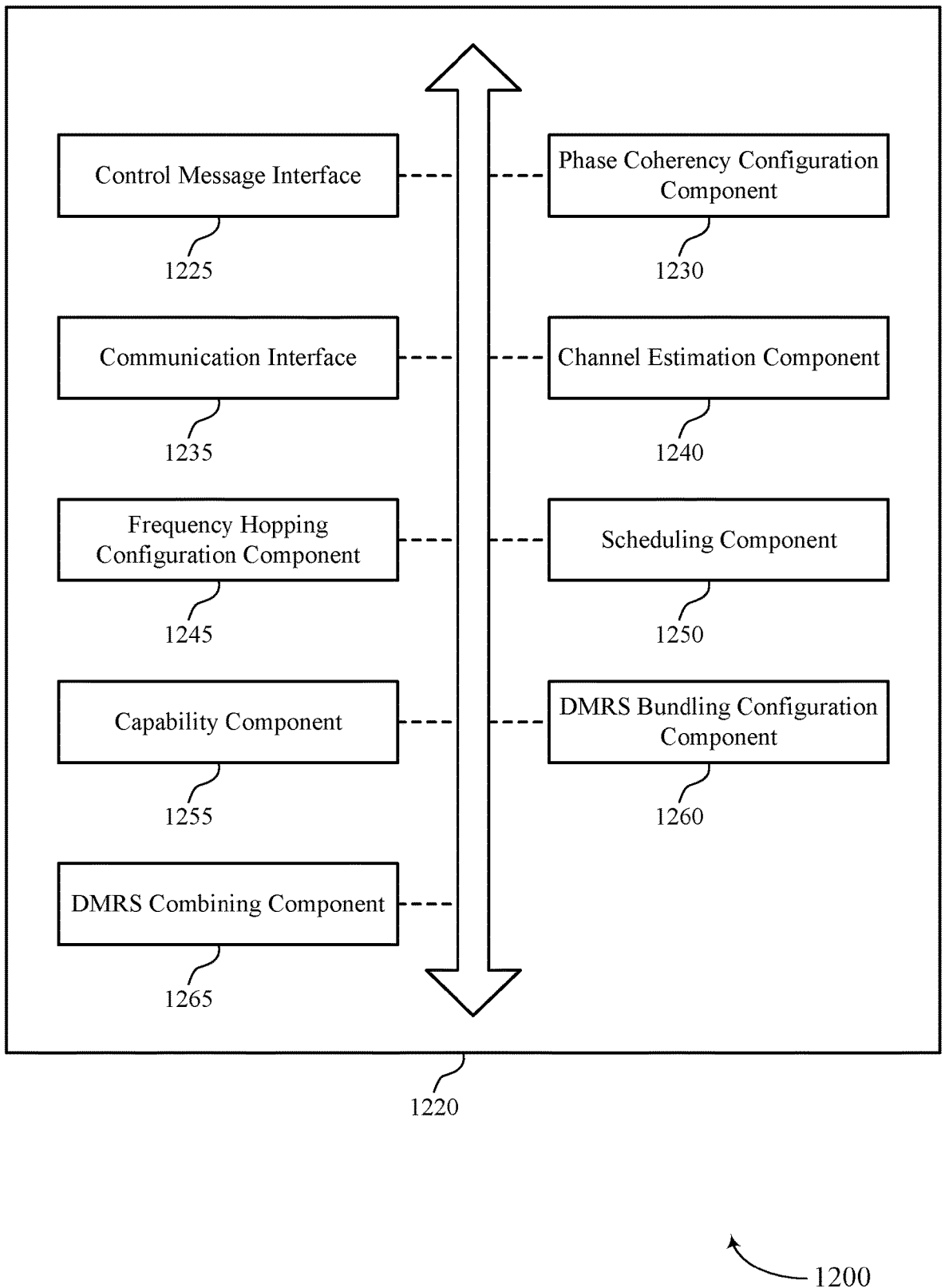
FIG. 12 shows a block diagram of a communications manager that supports reference signal bundling for uplink channel repetition in accordance with aspects of the present disclosure.

FIG. 12 shows a block diagram 1200 of a communications manager 1220 that supports reference signal bundling for uplink channel repetition in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of reference signal bundling for uplink channel repetition as described herein. For example, the communications manager 1220 may include a control message interface 1225, a phase coherency configuration component 1230, a communication interface 1235, a channel estimation component 1240, a frequency hopping configuration component 1245, a scheduling component 1250, a capability component 1255, a DMRS bundling configuration component 1260, a DMRS combining component 1265, or any combination thereof. Each of these components may communicate, directly or indirectly, with one another (e.g., via one or more buses).

The communications manager 1220 may support wireless communications at a base station in accordance with examples as disclosed herein. The control message interface 1225 may be configured as or otherwise support a means for transmitting, to a UE, one or more control messages scheduling a first set of repetitions of an uplink transmission and a second set of repetitions of the uplink transmission in accordance with a repetition configuration. The phase coherency configuration component 1230 may be configured as or otherwise support a means for determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions. The communication interface 1235 may be configured as or otherwise support a means for receiving one or both of the first set of repetitions with the first set of demodulation reference signals and the second set of repetitions with the second set of demodulation reference signals in accordance with the phase coherency configuration.

In some examples, the channel estimation component 1240 may be configured as or otherwise support a means for estimating a channel for the uplink transmission by combining at least two received demodulation reference signals corresponding to the first set of repetitions or corresponding to the second set of repetitions in accordance with the phase coherency configuration.

In some examples, the DMRS combining component 1265 may be configured as or otherwise support a means for combining the at least two received demodulation reference signals corresponding to non-consecutive first transmissions of the first set of repetitions or non-consecutive second transmissions of the second set of repetitions.

In some examples, the DMRS combining component 1265 may be configured as or otherwise support a means for combining the at least two received demodulation reference signals corresponding to consecutive first transmissions of the first set of repetitions or consecutive second transmissions of the second set of repetitions.

In some examples, the control message interface 1225 may be configured as or otherwise support a means for transmitting a control message that is indicative of a mapping scheme that the UE is to use for transmitting the one or more of the first set of repetitions and the one or more of the second set of repetitions, where the phase coherency configuration is determined based on the mapping scheme.

In some examples, the mapping scheme is one of a cyclic mapping scheme, a sequential mapping scheme, or a half-half mapping scheme.

In some examples, the frequency hopping configuration component 1245 may be configured as or otherwise support a means for transmitting, to the UE, an indication that the UE is to use a first frequency for transmitting the first set of repetitions and a second frequency for transmitting the second set of repetitions, where the phase coherency configuration is determined based on transmitting the indication.

In some examples, the scheduling component 1250 may be configured as or otherwise support a means for transmitting, to the UE, a scheduling indication that schedules the first set of repetitions and the second set of repetitions of a physical uplink shared channel transmission, and the repetitions are to be transmitted using a type A configuration or a type B configuration, where the type A configuration indicates that consecutive repetitions are to be transmitted in consecutive slots and the type B configuration indicates that consecutive repetitions are consecutively transmitted across one or more slots.

In some examples, the scheduling component 1250 may be configured as or otherwise support a means for transmitting, to the UE, a scheduling indication that schedules the first set of repetitions and the second set of repetitions of a physical uplink control channel transmission, and the repetitions are to be transmitted using an inter-slot configuration or an intra-slot configuration, where the inter-slot configuration indicates that consecutive repetitions are to be transmitted in consecutive slots and the intra-slot configuration indicates that consecutive repetitions are consecutively transmitted across one or more slots.

In some examples, the capability component 1255 may be configured as or otherwise support a means for receiving, from the UE, an indication of a UE capability to support maintaining a phase coherency across non-consecutive repetitions, where the phase coherency configuration is determined based on the UE capability.

In some examples, the DMRS bundling configuration component 1260 may be configured as or otherwise support a means for transmitting, to a UE, a demodulation reference signal bundling configuration that is indicative that the UE is to maintain phase coherency for uplink communications, where the phase coherency configuration is determined based on transmitting the demodulation reference signal bundling configuration.

Figure 13:
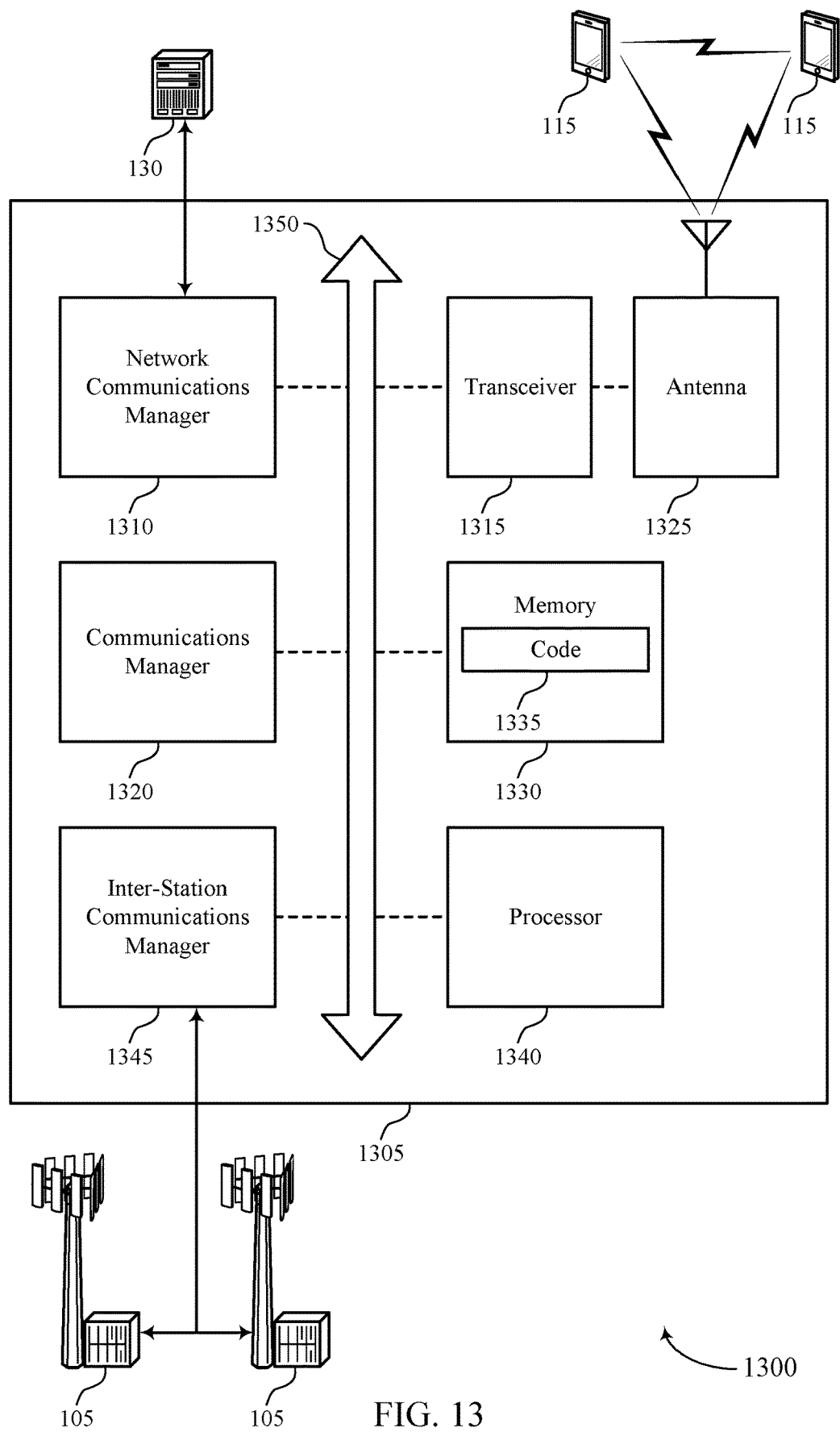
FIG. 13 shows a diagram of a system including a device that supports reference signal bundling for uplink channel repetition in accordance with aspects of the present disclosure.

FIG. 13 shows a diagram of a system 1300 including a device 1305 that supports reference signal bundling for uplink channel repetition in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting reference signal bundling for uplink channel repetition). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, one or more control messages scheduling a first set of repetitions of an uplink transmission and a second set of repetitions of the uplink transmission in accordance with a repetition configuration. The communications manager 1320 may be configured as or otherwise support a means for determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions. The communications manager 1320 may be configured as or otherwise support a means for receiving one or both of the first set of repetitions with the first set of demodulation reference signals and the second set of repetitions with the second set of demodulation reference signals in accordance with the phase coherency configuration.

By including or configuring the communications manager 1320 in accordance with examples as described herein, the device 1305 may support techniques for more efficient utilization of communication resources. By determining a phase coherency configuration for first and second sets of uplink repetitions, the device 1305 may receive DMRSs corresponding to the uplink transmissions such that the DMRSs may be combined for channel estimation. This technique may support reduced processing (e.g., the processor 1340) by combining bundled DMRSs and efficient communication for various devices (e.g., the device 1005 may efficiently estimate the channel using bundled DMRSs).

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of reference signal bundling for uplink channel repetition as described herein, or the processor 1340 and the memory 1330 may be otherwise configured to perform or support such operations.

Figure 14:
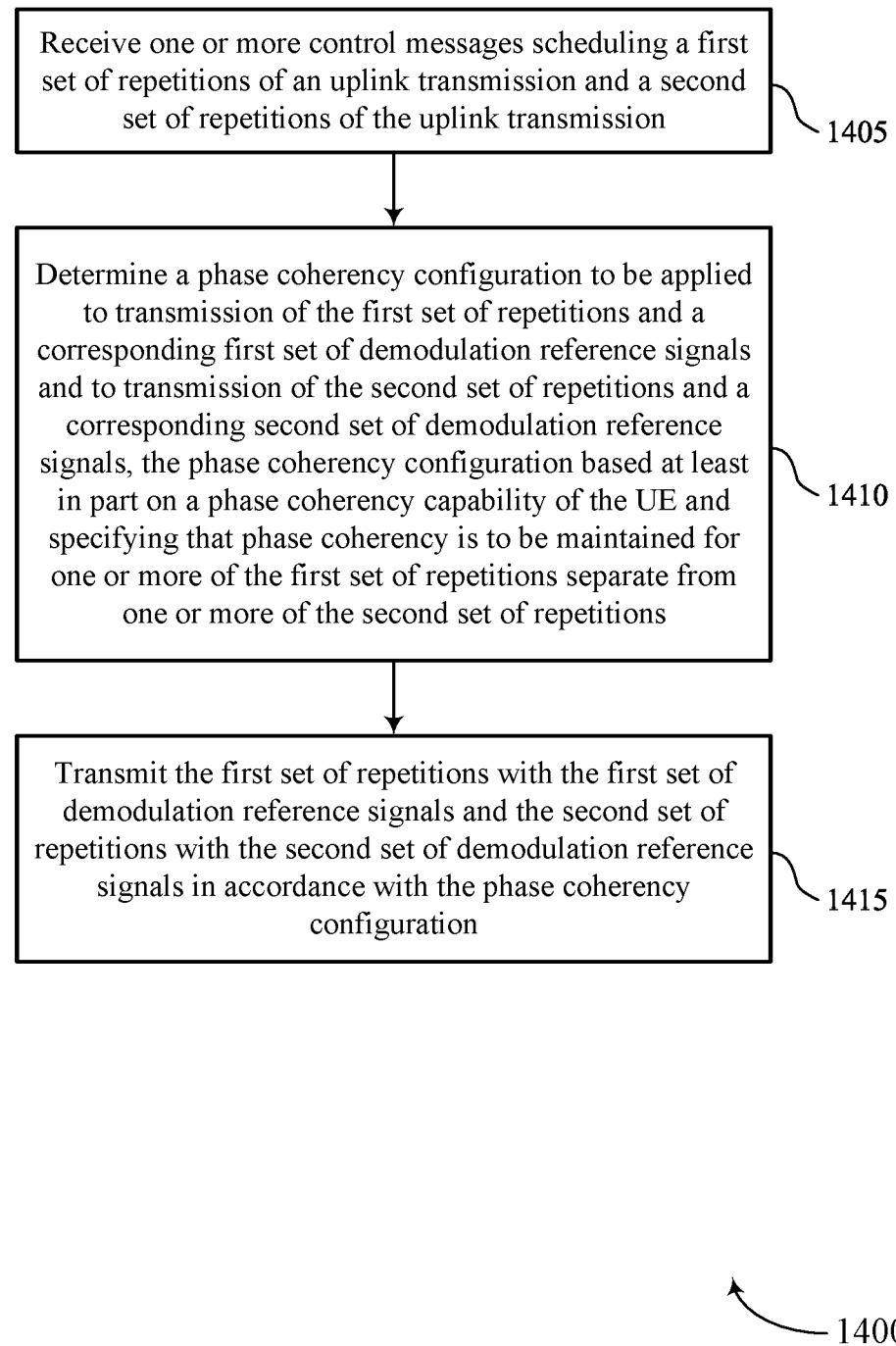
FIGS. 14 through 17 show flowcharts illustrating methods that support reference signal bundling for uplink channel repetition in accordance with aspects of the present disclosure.

FIG. 14 shows a flowchart illustrating a method 1400 that supports reference signal bundling for uplink channel repetition in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving one or more control messages scheduling a first set of repetitions of an uplink transmission and a second set of repetitions of the uplink transmission. The operations of 1405 may be performed in accordance with examples as disclosed herein. In some examples, aspects of the operations of 1405 may be performed by a control message interface 825 as described with reference to FIG. 8.

At 1410, the method may include determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The operations of 1410 may be performed in accordance with examples as disclosed herein. In some examples, aspects of the operations of 1410 may be performed by a phase coherency configuration component 830 as described with reference to FIG. 8.

At 1415, the method may include transmitting the first set of repetitions with the first set of demodulation reference signals and the second set of repetitions with the second set of demodulation reference signals in accordance with the phase coherency configuration. The operations of 1415 may be performed in accordance with examples as disclosed herein. In some examples, aspects of the operations of 1415 may be performed by a repetition interface 835 as described with reference to FIG. 8.

Figure 15:
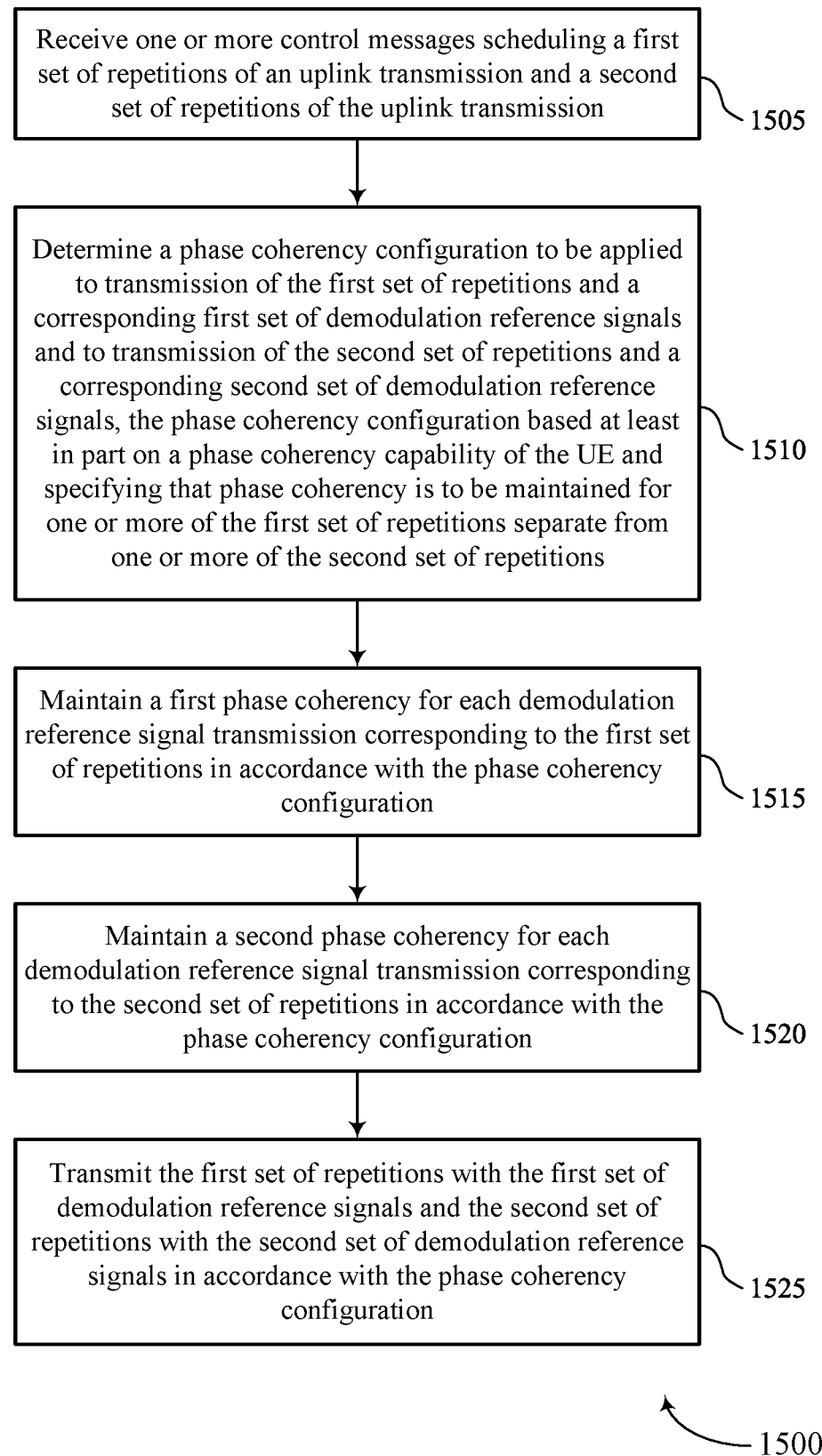

FIG. 15 shows a flowchart illustrating a method 1500 that supports reference signal bundling for uplink channel repetition in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving one or more control messages scheduling a first set of repetitions of an uplink transmission and a second set of repetitions of the uplink transmission. The operations of 1505 may be performed in accordance with examples as disclosed herein. In some examples, aspects of the operations of 1505 may be performed by a control message interface 825 as described with reference to FIG. 8.

At 1510, the method may include determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The operations of 1510 may be performed in accordance with examples as disclosed herein. In some examples, aspects of the operations of 1510 may be performed by a phase coherency configuration component 830 as described with reference to FIG. 8.

At 1515, the method may include maintaining a first phase coherency for each demodulation reference signal transmission corresponding to the first set of repetitions in accordance with the phase coherency configuration. The operations of 1515 may be performed in accordance with examples as disclosed herein. In some examples, aspects of the operations of 1515 may be performed by a DMRS transmission component 840 as described with reference to FIG. 8.

At 1520, the method may include maintaining a second phase coherency for each demodulation reference signal transmission corresponding to the second set of repetitions in accordance with the phase coherency configuration. The operations of 1520 may be performed in accordance with examples as disclosed herein. In some examples, aspects of the operations of 1520 may be performed by a DMRS transmission component 840 as described with reference to FIG. 8.

At 1525, the method may include transmitting the first set of repetitions with the first set of demodulation reference signals and the second set of repetitions with the second set of demodulation reference signals in accordance with the phase coherency configuration. The operations of 1525 may be performed in accordance with examples as disclosed herein. In some examples, aspects of the operations of 1525 may be performed by a repetition interface 835 as described with reference to FIG. 8.

Figure 16:
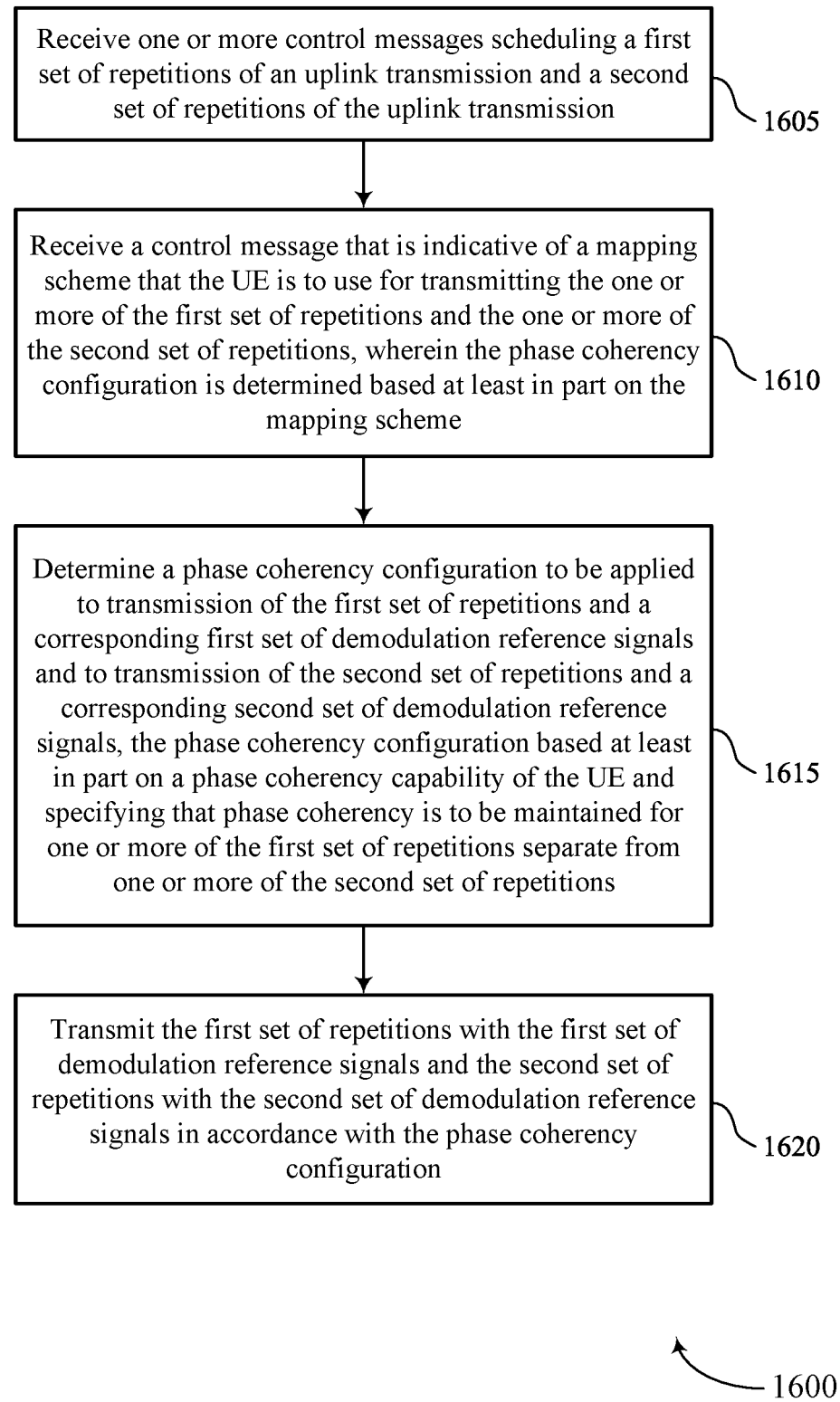

FIG. 16 shows a flowchart illustrating a method 1600 that supports reference signal bundling for uplink channel repetition in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving one or more control messages scheduling a first set of repetitions of an uplink transmission and a second set of repetitions of the uplink transmission. The operations of 1605 may be performed in accordance with examples as disclosed herein. In some examples, aspects of the operations of 1605 may be performed by a control message interface 825 as described with reference to FIG. 8.

At 1610, the method may include receiving a control message that is indicative of a mapping scheme that the UE is to use for transmitting the one or more of the first set of repetitions and the one or more of the second set of repetitions, where the phase coherency configuration is determined based on the mapping scheme. The operations of 1610 may be performed in accordance with examples as disclosed herein. In some examples, aspects of the operations of 1610 may be performed by a control message interface 825 as described with reference to FIG. 8.

At 1615, the method may include determining a phase coherency configuration to be applied to transmission of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency is to be maintained for one or more of the first set of repetitions separate from one or more of the second set of repetitions. The operations of 1615 may be performed in accordance with examples as disclosed herein. In some examples, aspects of the operations of 1615 may be performed by a phase coherency configuration component 830 as described with reference to FIG. 8.

At 1620, the method may include transmitting the first set of repetitions with the first set of demodulation reference signals and the second set of repetitions with the second set of demodulation reference signals in accordance with the phase coherency configuration. The operations of 1620 may be performed in accordance with examples as disclosed herein. In some examples, aspects of the operations of 1620 may be performed by a repetition interface 835 as described with reference to FIG. 8.

Figure 17:
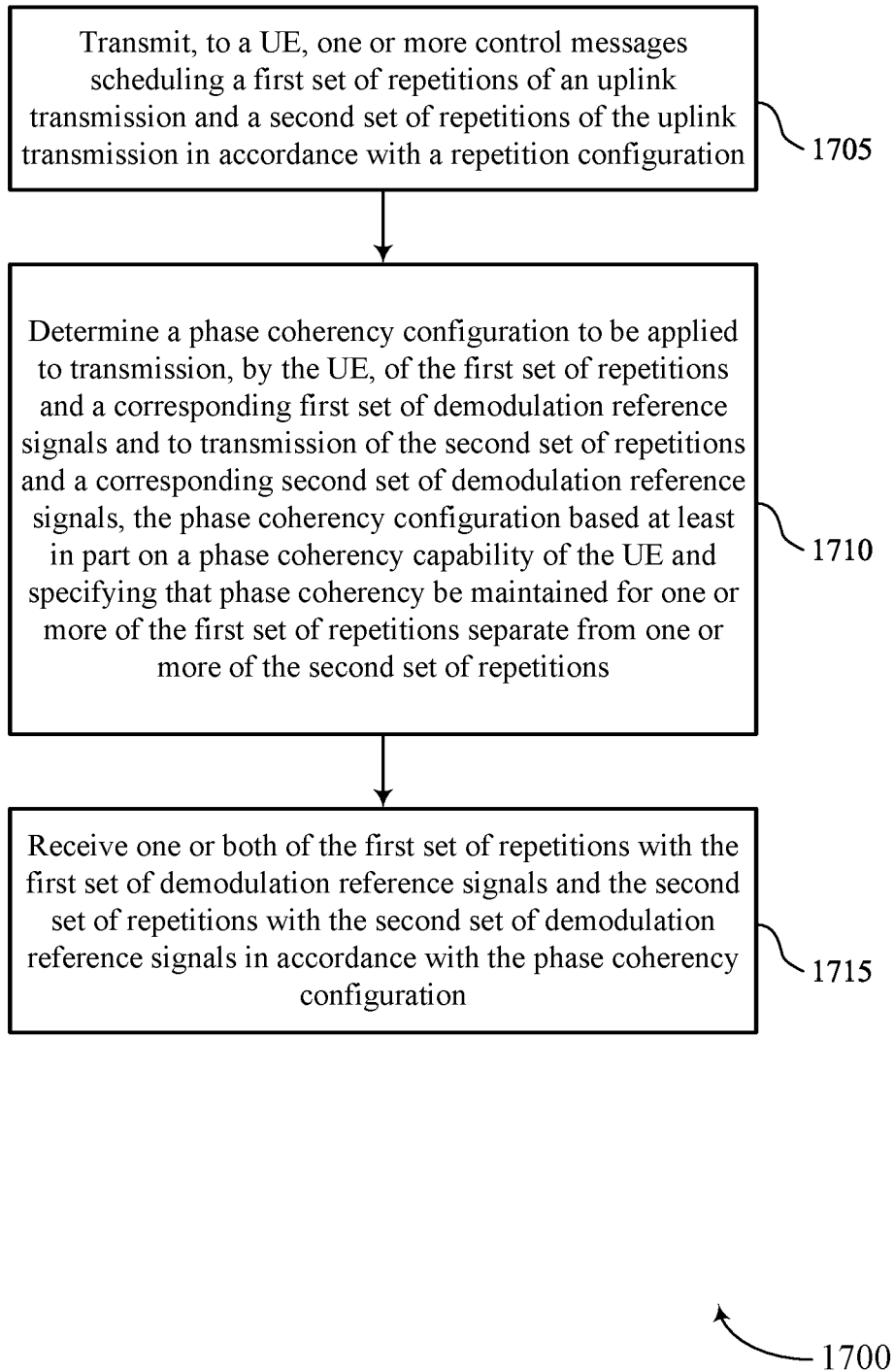

FIG. 17 shows a flowchart illustrating a method 1700 that supports reference signal bundling for uplink channel repetition in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, one or more control messages scheduling a first set of repetitions of an uplink transmission and a second set of repetitions of the uplink transmission in accordance with a repetition configuration. The operations of 1705 may be performed in accordance with examples as disclosed herein. In some examples, aspects of the operations of 1705 may be performed by a control message interface 1225 as described with reference to FIG. 12.

At 1710, the method may include determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based on a phase coherency capability of the UE and specifying that phase coherency be maintained for one or more of the first set of repetitions separate from one or more of the second set of repetitions. The operations of 1710 may be performed in accordance with examples as disclosed herein. In some examples, aspects of the operations of 1710 may be performed by a phase coherency configuration component 1230 as described with reference to FIG. 12.

At 1715, the method may include receiving one or both of the first set of repetitions with the first set of demodulation reference signals and the second set of repetitions with the second set of demodulation reference signals in accordance with the phase coherency configuration. The operations of 1715 may be performed in accordance with examples as disclosed herein. In some examples, aspects of the operations of 1715 may be performed by a communication interface 1235 as described with reference to FIG. 12.

The following provides an overview of aspects of the present disclosure:

Aspect 1: A method for wireless communications at a UE, comprising: receiving one or more control messages scheduling a first set of repetitions of an uplink transmission and a second set of repetitions of the uplink transmission; determining a phase coherency configuration to be applied to transmission of the first set of repetitions and a corresponding first set of demodulation reference signals and to transmission of the second set of repetitions and a corresponding second set of demodulation reference signals, the phase coherency configuration based at least in part on a phase coherency capability of the UE and specifying that phase coherency is to be maintained for one or more of the first set of repetitions separate from one or more of the second set of repetitions; and transmitting the first set of repetitions with the first set of demodulation reference signals and the second set of repetitions with the second set of demodulation reference signals in accordance with the phase coherency configuration.

Aspect 2: The method of aspect 1, further comprising: maintaining a first phase coherency for each demodulation reference signal transmission corresponding to the first set of repetitions in accordance with the phase coherency configuration; and maintaining a second phase coherency for each demodulation reference signal transmission corresponding to the second set of repetitions in accordance with the phase coherency configuration.

Aspect 3: The method of any of aspects 1 through 2, further comprising: receiving a control message that is indicative of a mapping scheme that the UE is to use for transmitting the one or more of the first set of repetitions and the one or more of the second set of repetitions, wherein the phase coherency configuration is determined based at least in part on the mapping scheme.

Aspect 4: The method of aspect 3, wherein the mapping scheme is one of a cyclic mapping scheme, a sequential mapping scheme, or a half-half mapping scheme.

Aspect 5: The method of any of aspects 1 through 4, further comprising: determining that the UE is to transmit the first set of repetitions and the second set of repetitions according to a cyclic mapping scheme such that the one or more of the first set of repetitions and the one or more of the second set of repetitions are to be transmitted in an alternating order; transmitting each demodulation reference signal transmission for the first set of repetitions without maintaining a phase coherency in accordance with the phase coherency configuration; and transmitting each demodulation reference signal transmission for the second set of repetitions without maintaining the phase coherency in accordance with the phase coherency configuration.

Aspect 6: The method of any of aspects 1 and 3 through 4, further comprising: maintaining a first phase coherency for demodulation reference signal transmissions corresponding to contiguous first repetitions of the first set of repetitions in accordance with the phase coherency configuration; and maintaining a second phase coherency for demodulation reference signal transmissions corresponding to contiguous second repetitions of the second set of repetitions in accordance with the phase coherency configuration.

Aspect 7: The method of any of aspects 1 through 4, and 6, further comprising: maintaining the first phase coherency across demodulation reference signal transmissions corresponding to each contiguous set of first repetitions of the first set of repetitions in accordance with the phase coherency configuration; and maintaining the second phase coherency across demodulation reference signal transmissions corresponding to each contiguous set of second repetitions of the second set of repetitions in accordance with the phase coherency configuration.

Aspect 8: The method of aspect 6, wherein receiving the one or more control messages comprises: receiving a control message that specifies that the UE is to use a sequential mapping scheme such that two first repetitions of the first set of repetitions are to be transmitted contiguously and two second repetitions of the second set of repetitions are to be transmitted contiguously.

Aspect 9: The method of any of aspects 6 through 7, wherein receiving the one or more control messages comprises: receiving a control message that specifies that the UE is to use a half-half mapping such that the first set of repetitions are to be transmitted contiguously, and the second set of repetitions are to be transmitted contiguously.

Aspect 10: The method of any of aspects 1 through 9, wherein receiving the one or more control messages comprises: receiving a control message that indicates that the UE is to use a first set of transmission parameters for transmitting the first set of repetitions and is to use a second set of transmission parameters for transmitting the second set of repetitions, wherein the first set of repetitions and the corresponding first set of demodulation reference signals are transmitted according to the first set of transmission parameters and the second set of repetitions and the corresponding second set of demodulation reference signals are transmitted according to the second set of transmission parameters.

Aspect 11: The method of aspect 10, wherein the first set of transmission parameters and the second set of transmission parameters include one or more an uplink beam, at least one uplink power control parameter, and a precoding, at least one value for the second set of transmission parameters is different from a corresponding value for the first set of transmission parameters.

Aspect 12: The method of any of aspects 1 through 11, further comprising: receiving a control message that indicates that the UE is to use frequency hopping such that the UE is to transmit the first set of repetitions at a first frequency and the second set of repetitions at a second frequency, wherein the phase coherency configuration is determined based at least in part on the indication that the UE is to use the frequency hopping.

Aspect 13: The method of any of aspects 1 through 4 and 6 through 12, further comprising: determining that the UE is to transmit the first set of repetitions at a first frequency and the second set of repetitions at a second frequency; maintaining a first phase coherency for each demodulation reference signal transmission corresponding to the first set of repetitions at the first frequency in accordance with the phase coherency configuration; and maintaining a second phase coherency for each demodulation reference signal transmission corresponding to the second set of repetitions at the second frequency in accordance with the phase coherency configuration.

Aspect 14: The method of any of aspects 1 and 3 through 5, further comprising: determining that the UE is to transmit the first set of repetitions at a first frequency and the second set of repetitions at a second frequency; transmitting each demodulation reference signal transmission corresponding to the first set of repetitions at the first frequency without maintaining a phase coherency in accordance with the phase coherency configuration; and transmitting each demodulation reference signal transmission corresponding to the second set of repetitions at the second frequency without maintaining the phase coherency in accordance with the phase coherency configuration.

Aspect 15: The method of any of aspects 1 through 4 and 6 through 13, further comprising: determining that the UE is to transmit the first set of repetitions at a first frequency and the second set of repetitions at a second frequency; maintaining a first phase coherency for demodulation reference signal transmissions corresponding to contiguous first repetitions of the first set of repetitions at the first frequency in accordance with the phase coherency configuration; and maintaining a second phase coherency for demodulation reference signal transmissions corresponding to contiguous second repetitions of the second set of repetitions at the second frequency in accordance with the phase coherency configuration.

Aspect 16: The method of any of aspects 1 through 4, 6 through 13, and 15, further comprising: maintaining the first phase coherency across demodulation reference signal transmissions and corresponding to each contiguous set of first repetitions of the first set of repetitions at the first frequency in accordance with the phase coherency configuration; and maintaining the second phase coherency across demodulation reference signal transmissions and corresponding to each contiguous set of second repetitions of the second set of repetitions at the second frequency in accordance with the phase coherency configuration.

Aspect 17: The method of any of aspects 1 through 16, wherein receiving the one or more control messages comprises: receiving a scheduling indication that schedules the first set of repetitions and the second set of repetitions of a physical uplink shared channel transmission, and the repetitions are to be transmitted using a type A configuration or a type B configuration, wherein the type A configuration indicates that consecutive repetitions are to be transmitted in consecutive slots and the type B configuration indicates that consecutive repetitions are consecutively transmitted across one or more slots.

Aspect 18: The method of any of aspects 1 through 17, wherein receiving the one or more control messages comprises: receiving a scheduling indication that schedules the first set of repetitions and the second set of repetitions of a physical uplink control channel transmission, and the repetitions are to be transmitted using an inter-slot configuration or an intra-slot configuration, wherein the inter-slot configuration indicates that consecutive repetitions are to be transmitted in consecutive slots and the intra-slot configuration indicates that consecutive repetitions are consecutively transmitted across one or more slots.

Aspect 19: The method of any of aspects 1 through 18, further comprising: transmitting, by the UE, an indication of a UE capability to support maintaining a phase coherency across non-consecutive repetitions, wherein the one or more control messages are received based at least in part on the indication of the UE capability.

Aspect 20: The method of any of aspects 1 through 19, further comprising: receiving a demodulation reference signal bundling configuration that is indicative that the UE is to maintain phase coherency for uplink communications, wherein the phase coherency configuration is determined based at least in part on receiving the demodulation reference signal bundling configuration.

Aspect 21: A method for wireless communications at a base station, comprising: transmitting, to a UE, one or more control messages scheduling a first set of repetitions of an uplink transmission and a second set of repetitions of the uplink transmission in accordance with a repetition configuration; determining a phase coherency configuration to be applied to transmission, by the UE, of the first set of repetitions and a corresponding first set of demodulation reference signals and to transmission of the second set of repetitions and a corresponding second set of demodulation reference signals, the phase coherency configuration based at least in part on a phase coherency capability of the UE and specifying that phase coherency be maintained for one or more of the first set of repetitions separate from one or more of the second set of repetitions; and receiving one or both of the first set of repetitions with the first set of demodulation reference signals and the second set of repetitions with the second set of demodulation reference signals in accordance with the phase coherency configuration.

Aspect 22: The method of aspect 21, further comprising: estimating a channel for the uplink transmission by combining at least two received demodulation reference signals corresponding to the first set of repetitions or corresponding to the second set of repetitions in accordance with the phase coherency configuration.

Aspect 23: The method of aspect 22, further comprising: combining the at least two received demodulation reference signals corresponding to non-consecutive first transmissions of the first set of repetitions or non-consecutive second transmissions of the second set of repetitions.

Aspect 24: The method of any of aspects 22 through 23, further comprising: combining the at least two received demodulation reference signals corresponding to consecutive first transmissions of the first set of repetitions or consecutive second transmissions of the second set of repetitions.

Aspect 25: The method of any of aspects 21 through 24, further comprising: transmitting a control message that is indicative of a mapping scheme that the UE is to use for transmitting the one or more of the first set of repetitions and the one or more of the second set of repetitions, wherein the phase coherency configuration is determined based at least in part on the mapping scheme.

Aspect 26: The method of aspect 25, wherein the mapping scheme is one of a cyclic mapping scheme, a sequential mapping scheme, or a half-half mapping scheme.

Aspect 27: The method of any of aspects 21 through 26, further comprising: transmitting, to the UE, an indication that the UE is to use a first frequency for transmitting the first set of repetitions and a second frequency for transmitting the second set of repetitions, wherein the phase coherency configuration is determined based at least in part on transmitting the indication.

Aspect 28: The method of any of aspects 21 through 27, further comprising: transmitting, to the UE, a scheduling indication that schedules the first set of repetitions and the second set of repetitions of a physical uplink shared channel transmission, and the repetitions are to be transmitted using a type A configuration or a type B configuration, wherein the type A configuration indicates that consecutive repetitions are to be transmitted in consecutive slots and the type B configuration indicates that consecutive repetitions are consecutively transmitted across one or more slots.

Aspect 29: The method of any of aspects 21 through 28, further comprising: transmitting, to the UE, a scheduling indication that schedules the first set of repetitions and the second set of repetitions of a physical uplink control channel transmission, and the repetitions are to be transmitted using an inter-slot configuration or an intra-slot configuration, wherein the inter-slot configuration indicates that consecutive repetitions are to be transmitted in consecutive slots and the intra-slot configuration indicates that consecutive repetitions are consecutively transmitted across one or more slots.

Aspect 30: The method of any of aspects 21 through 29, further comprising: receiving, from the UE, an indication of a UE capability to support maintaining a phase coherency across non-consecutive repetitions, wherein the phase coherency configuration is determined based at least in part on the UE capability.

Aspect 31: The method of any of aspects 21 through 30, further comprising: transmitting, to a UE, a demodulation reference signal bundling configuration that is indicative that the UE is to maintain phase coherency for uplink communications, wherein the phase coherency configuration is determined based at least in part on transmitting the demodulation reference signal bundling configuration.

Aspect 32: An apparatus for wireless communications at a UE, comprising a processor; memory coupled with the processor; and instructions stored in the memory and executable by the processor to cause the apparatus to perform a method of any of aspects 1 through 20.

Aspect 33: An apparatus for wireless communications at a UE, comprising at least one means for performing a method of any of aspects 1 through 20.

Aspect 34: A non-transitory computer-readable medium storing code for wireless communications at a UE, the code comprising instructions executable by a processor to perform a method of any of aspects 1 through 20.

Aspect 35: An apparatus for wireless communications at a base station, comprising a processor; memory coupled with the processor; and instructions stored in the memory and executable by the processor to cause the apparatus to perform a method of any of aspects 21 through 31.

Aspect 36: An apparatus for wireless communications at a base station, comprising at least one means for performing a method of any of aspects 21 through 31.

Aspect 37: A non-transitory computer-readable medium storing code for wireless communications at a base station, the code comprising instructions executable by a processor to perform a method of any of aspects 21 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
   a processor;
   memory coupled with the processor; and
   instructions stored in the memory and executable by the processor to cause the apparatus to:
      receive one or more control messages scheduling a set of repetitions of an uplink transmission, wherein frequency hopping is configured for the set of repetitions;

transmit, at a first frequency, a first plurality of consecutive repetitions of the set of repetitions in accordance with the frequency hopping configured for the set of repetitions, wherein each of the first plurality of consecutive repetitions is transmitted in a respective slot of a first set of consecutive slots; and transmit, at a second frequency different from the first frequency and after transmission of the first plurality of consecutive repetitions, a second plurality of consecutive repetitions of the set of repetitions in accordance with the frequency hopping configured for the set of repetitions, wherein each of the second plurality of consecutive repetitions is transmitted in a respective slot of a second set of consecutive slots, at the second frequency.

2. The apparatus of claim 1, wherein the instructions to receive the one or more control messages are executable by the processor to cause the apparatus to:

receive the one or more control messages indicating a quantity of the first plurality of consecutive repetitions at the first frequency, a second quantity of the second plurality of consecutive repetitions, or both.

3. The apparatus of claim 2, wherein the one or more control messages comprise a radio resource control message comprising a parameter indicating the quantity.

4. The apparatus of claim 1, wherein the instructions are further executable by the processor to cause the apparatus to:

maintain a first phase coherency across the first plurality of consecutive repetitions; and maintain a second phase coherency across the second plurality of consecutive repetitions.

5. The apparatus of claim 4, wherein the first phase coherency and the second phase coherency are maintained in accordance with a demodulation reference signal bundling configuration.

6. The apparatus of claim 1, wherein the uplink transmission comprises a physical uplink control channel transmission or a physical uplink shard channel transmission.

7. A method for wireless communications, comprising:

receiving one or more control messages scheduling a set of repetitions of an uplink transmission, wherein frequency hopping is configured for the set of repetitions;

transmitting, at a first frequency, a first plurality of consecutive repetitions of the set of repetitions in accordance with the frequency hopping configured for the set of repetitions, wherein transmitting the first plurality of consecutive repetitions comprises transmitting each of the first plurality of consecutive repetitions in a respective slot of a first set of consecutive slots; and transmitting, at a second frequency different from the first frequency and after transmission of the first plurality of consecutive repetitions, a second plurality of consecutive repetitions of the set of repetitions in accordance with the frequency hopping configured for the set of repetitions, wherein transmitting the second plurality of consecutive repetitions comprises transmitting each of the second plurality of consecutive repetitions in a respective slot of a second set of consecutive slots, at the second frequency.

8. The method of claim 7, wherein receiving the one or more control messages comprises:

receiving the one or more control messages indicating a quantity of the first plurality of consecutive repetitions at the first frequency, a second quantity of the second plurality of consecutive repetitions, or both.

9. The method of claim 8, wherein the one or more control messages comprise a radio resource control message comprising a parameter indicating the quantity.

10. The method of claim 7, further comprising:

maintaining a first phase coherency across the first plurality of consecutive repetitions; and maintaining a second phase coherency across the second plurality of consecutive repetitions.

11. The method of claim 10 wherein the first phase coherency and the second phase coherency are maintained in accordance with a demodulation reference signal bundling configuration.

12. The method of claim 7, wherein the uplink transmission comprises a physical uplink control channel transmission or a physical uplink shard channel transmission.

13. An apparatus for wireless communications, comprising:

means for receiving one or more control messages scheduling a set of repetitions of an uplink transmission, wherein frequency hopping is configured for the set of repetitions;

means for transmitting, at a first frequency, a first plurality of consecutive repetitions of the set of repetitions in accordance with the frequency hopping configured for the set of repetitions;

means for transmitting each of the first plurality of consecutive repetitions in a respective slot of a first set of consecutive slots; and means for transmitting, at a second frequency different from the first frequency and after transmission of the first plurality of consecutive repetitions, a second plurality of consecutive repetitions of the set of repetitions in accordance with the frequency hopping configured for the set of repetitions, wherein the means for transmitting the second plurality of consecutive repetitions comprises means for transmitting each of the second plurality of consecutive repetitions in a respective slot of a second set of consecutive slots, at the second frequency.

14. The apparatus of claim 13, wherein the means for receiving the one or more control messages comprise:

means for receiving the one or more control messages indicating a quantity of the first plurality of consecutive repetitions at the first frequency, a second quantity of the second plurality of consecutive repetitions, or both.

15. The apparatus of claim 14, wherein:

the one or more control messages comprise a radio resource control message comprising a parameter indicating the quantity.

16. The apparatus of claim 13, further comprising:

means for maintaining a first phase coherency across the first plurality of consecutive repetitions; and means for maintaining a second phase coherency across the second plurality of consecutive repetitions.

17. A non-transitory computer-readable medium storing code for wireless communications, the code comprising instructions executable by a processor to:

receive one or more control messages scheduling a set of repetitions of an uplink transmission, wherein frequency hopping is configured for the set of repetitions;

transmit, at a first frequency, a first plurality of consecutive repetitions of the set of repetitions in accordance with the frequency hopping configured for the set of repetitions, wherein each of the first plurality of consecutive repetitions is transmitted in a respective slot of a first set of consecutive slots; and transmit, at a second frequency different from the first frequency and after transmission of the first plurality of consecutive repetitions, a second plurality of consecutive repetitions of the set of repetitions in accordance with the frequency hopping configured for the set of repetitions, wherein each of the second plurality of consecutive repetitions is transmitted in a respective slot of a second set of consecutive slots, at the second frequency.

* * * * *